(12) United States Patent
Lei

(10) Patent No.: US 12,363,588 B2
(45) Date of Patent: Jul. 15, 2025

(54) DATA TRANSMISSION METHOD AND APPARATUS, COMPUTER READABLE MEDIUM, AND ELECTRONIC DEVICE

(71) Applicant: TENCENT TECHNOLOGY (SHENZHEN) COMPANY LIMITED, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 422 days.

(21) Appl. No.: 17/986,506

(22) Filed: Nov. 14, 2022

(65) Prior Publication Data

US 2023/0070702 A1 Mar. 9, 2023

Related U.S. Application Data

(63) Continuation of application No. PCT/CN2021/120129, filed on Sep. 24, 2021.

(30) Foreign Application Priority Data

Jan. 4, 2021 (CN) .......................... 202110003827.8

(51) Int. Cl.
*H04W 28/06* (2009.01)
*H04L 65/1063* (2022.01)

(52) U.S. Cl.
CPC ....... *H04W 28/065* (2013.01); *H04L 65/1063* (2013.01)

(58) Field of Classification Search
CPC .......................... H04W 28/065; H04L 65/1063
See application file for complete search history.

(56) References Cited

U.S. PATENT DOCUMENTS

2020/0221329 A1* 7/2020 Kim ................... H04W 12/037
2022/0174538 A1* 6/2022 Zhu ................... H04W 28/0263

FOREIGN PATENT DOCUMENTS

CN       101127918 A       2/2008
CN       102547375 A       7/2012
(Continued)

OTHER PUBLICATIONS

The World Intellectual Property Organization (WIPO) International Search Report for PCT/CN2021/120129 Dec. 27, 2021 7 Pages (including translation).

(Continued)

*Primary Examiner* — Alex Skripnikov
(74) *Attorney, Agent, or Firm* — ANOVA LAW GROUP PLLC

(57) ABSTRACT

A data transmission method includes: receiving access stratum context information transmitted by an AMF; detecting, in response to identifying that a data packet transmitted by a UPF through the GTP-U tunnel belongs to sub-data packets obtained by splitting the advanced interactive data packet, whether there is a sub-data packet that fails to transmit in the sub-data packets obtained by splitting the advanced interactive data packet during transmitting the sub-data packets to a user equipment on the basis of the DRB; and stopping transmitting the remaining sub-data packets obtained by splitting a specified type of advanced interactive data packet to the user equipment in response to detecting that there is a sub-data packet that fails to transmit in the sub-data packets obtained by splitting the specified type of advanced interactive data packet.

20 Claims, 12 Drawing Sheets

(56) References Cited

FOREIGN PATENT DOCUMENTS

| CN | 108366306 A | 8/2018 |
|---|---|---|
| CN | 112770312 A | 5/2021 |
| CN | 112804710 A | 5/2021 |
| CN | 112804711 A | 5/2021 |
| WO | 2018039179 A1 | 3/2018 |

OTHER PUBLICATIONS

Huawei et al. "Uplink bearer identification for eLWA", May 27, 2016, 3GPP TSG-RAN WG2 Meeting #94 R2-163765, Nanjing China.

* cited by examiner

DATA TRANSMISSION METHOD AND APPARATUS, COMPUTER READABLE MEDIUM, AND ELECTRONIC DEVICE

RELATED APPLICATION(S)

This application is a continuation application of PCT Patent Application PCT/CN2021/120129 filed on Sep. 24, 2021, which claims priority to Chinese Patent Application No. 202110003827.8, entitled "DATA TRANSMISSION METHOD AND APPARATUS, COMPUTER READABLE MEDIUM, AND ELECTRONIC DEVICE" and filed with the China National Intellectual Property Administration on Jan. 4, 2021, all of which are incorporated herein by reference in entirety.

FIELD OF THE TECHNOLOGY

The present disclosure relates to the field of communication technologies, and in particular, to a data transmission method and apparatus, a computer readable medium, and an electronic device.

BACKGROUND

In 5G and evolved 5G systems, high-bandwidth advanced interactive services are important service types, such as cloud gaming, virtual reality (VR), augmented reality (AR), mixed reality (MR), extended reality (ER), and cinematic reality (CR). These advanced interactive services have certain desirables for timeliness of transmission. Moreover, with the improvement of the indexes, such as resolution, frame rate, and degree of freedom, the data volume generated by an application layer increases greatly, which brings a great load to network transmission. The data packet content generated by an application layer of this service may be segmented into a large number of data packet segments for transmission with a very low delay. Once the transmission of one of the segments does not meet certain transmission desirables, then the overall data packet content cannot be recovered and presented in real time at a receiving end, so the desirables of an advanced interactive high-bandwidth service cannot be met. For the present disclosure scenario, how to ensure that the occupation of transmission resources is reduced as much as possible during transmission of data packets of the advanced interactive service is an urgent technical problem to be solved.

SUMMARY

According to embodiments provided in the present disclosure, a data transmission method and apparatus, a computer readable medium, and an electronic device are provided.

Other features and advantages of the present disclosure become obvious through the following detailed descriptions, or may be partially learned partially through the practice of the present disclosure.

In one aspect, the present disclosure provides a data transmission method, which includes: receiving access stratum context information transmitted by an access and mobility management function (AMF), the access stratum context information being used for indicating that a plurality of types of advanced interactive data packets are transmitted in the same general packet radio service tunneling protocol-user plane (GTP-U) tunnel and are carried by the same data radio bearer (DRB); detecting, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB; and stopping transmitting the remaining sub-data packets obtained by splitting a specified type of advanced interactive data packet to the user equipment in response to detecting that there is a sub-data packet that fails to transmit to the user equipment in the sub-data packets obtained by splitting the specified type of advanced interactive data packet.

In another aspect, the present disclosure provides a data transmission method, which includes: receiving protocol data unit (PDU) session management policy information transmitted by a session management function (SMF), the PDU session management policy information being used for indicating that a plurality of types of advanced interactive data packets are transmitted in the same GTP-U tunnel and are carried by the same DRB; distributing and transmitting, in the GTP-U tunnel, the received sub-data packets obtained by splitting the plurality of types of advanced interactive data packets to a next generation nodeB, and detecting whether there is a sub-data packet that fails to transmit to the next generation nodeB in the sub-data packets obtained by splitting the advanced interactive data packet; and stopping transmitting the remaining sub-data packets obtained by splitting the specified type of advanced interactive data packet to the next generation nodeB in response to detecting that there is a sub-data packet that fails to transmit to the next generation nodeB in the sub-data packets obtained by splitting the specified type of advanced interactive data packet.

In yet another aspect, the present disclosure provides a data transmission method, which includes: receiving a user equipment route selection policy (URSP) rule transmitted by an AMF, the URSP rule being used for indicating that a plurality of types of advanced interactive data packets are transmitted in the same GTP-U tunnel and are carried by the same DRB; detecting, in response to identifying that a data packet transmitted by the next generation nodeB on the basis of the DRB belongs to sub-data packets obtained by splitting the advanced interactive data packet, a receiving condition of the sub-data packet during receiving the sub-data packets obtained by splitting the advanced interactive data packet; and integrating all of the data packets to obtain the specified type of advanced interactive data packet in response to receiving all sub-data packets obtained by splitting the specified type of advanced interactive data packet.

In yet another aspect, the present disclosure provides a data transmission method, which includes: receiving GTP-U tunnel configuration information transmitted by an application function (AF) for an advanced interactive data packet, the GTP-U tunnel configuration information being used for indicating that a plurality of types of advanced interactive data packets are transmitted in the same GTP-U tunnel and are carried by the same DRB; generating a URSP rule and protocol data unit (PDU) session management policy information according to the GTP-U tunnel configuration information, the URSP rule and the PDU session management policy information being used for indicating that a plurality of types of advanced interactive data packets are differentially transmitted in the same GTP-U tunnel and are carried by the same DRB; transmitting the URSP rule to the AMF, so that the AMF forwards the URSP rule to a user equipment and configures access stratum context information to a next generation nodeB according to the URSP rule, the access stratum context information being used for indicating that a plurality of types of advanced interactive data packets are differentially transmitted in the same general packet radio service tunneling protocol-user plane (GTP-U) tunnel and are carried by the same data radio bearer (DRB); and transmitting the PDU session management policy information to the SMF, so that the SMF configures the PDU session management policy information to a user plane function entity.

In yet another aspect, the present disclosure provides a data transmission apparatus, which includes: a memory storing computer program instructions; and a processor coupled to the memory and configured to execute the computer program instructions and perform: any of the methods, such as the method of receiving access stratum context information transmitted by an access and mobility management function (AMF), the access stratum context information being used for indicating that a plurality of types of advanced interactive data packets are transmitted in the same general packet radio service tunneling protocol-user plane (GTP-U) tunnel and are carried by the same data radio bearer (DRB); detecting, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB; and stopping transmitting the remaining sub-data packets obtained by splitting a specified type of advanced interactive data packet to the user equipment in response to detecting that there is a sub-data packet that fails to transmit to the user equipment in the sub-data packets obtained by splitting the specified type of advanced interactive data packet.

In yet another aspect, the present disclosure provides a computer readable medium, storing a computer readable instruction, the computer readable instruction, when executed by a processor, implementing the data transmission method according to the embodiments.

In yet another aspect, the present disclosure provides an electronic device, including: one or more processors; and a storage apparatus, configured to store one or more computer readable instructions, the one or more computer readable instructions, when executed by the one or more processors, causing the one or more processors to implement the data transmission method according to the embodiments.

Details of one or more embodiments of the present disclosure are provided in the accompanying drawings and descriptions below. Other features, objectives, and advantages of the present disclosure are illustrated in the present disclosure, the accompanying drawings, and the claims.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

"Plurality of" mentioned herein means two or more. And/or describes an association relationship for describing associated objects and represents that three relationships may exist. For example, A and/or B may represent the following three scenarios: Only A exists, both A and B exist, and only B exists. The character "/" generally indicates an "or" relationship between the associated objects.

With the development of the 5th-Generation (5G) Mobile Communication Technology, many services desiring a large data volume and a short delay are applied. For example, interactive services, such as a cloud gaming service, VR, AR, MR, XR, and CR can also be referred to as Advanced Interactive Service (AIS) services.

Figure 1:
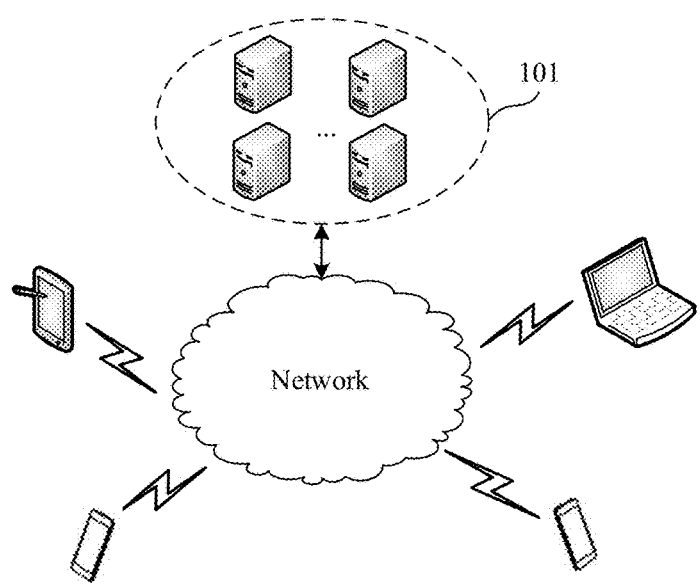
FIG. 1 is a schematic diagram of exemplary system architecture according to certain embodiment(s) of the present disclosure.

For example, in a cloud gaming scenario as shown in FIG. 1, a cloud server 101 is configured to run a game. The cloud server 101 may render a game screen, perform encoding processing on an audio signal and a rendered image, and finally transmit the encoded data obtained by the encoding processing to each game client through a network. The game client may be a user equipment with streaming media playback capability, human-computer interaction capability, communication capability, etc., such as a smart phone, a tablet computer, a notebook computer, a desktop computer, and a smart TV; or the game client may be an application running in a terminal device. In certain embodiment(s), the game client may decode the encoded data transmitted by the cloud server 101, so as to obtain an analog audio and video signal and play the same. It is to be understood that FIG. 1 is only exemplary system architecture representing a cloud gaming system, but does not limit the specific architecture of the cloud gaming system. For example, in other embodiments, the cloud gaming system may further include a backend server configured to schedule and the like. In addition, the cloud server 101 may be an independent physical server, or may be a server cluster or a distributed system formed by a plurality of physical servers, or may be a cloud server that provides a cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The game client and the cloud server 101 may be directly or indirectly connected in a wired or wireless communication manner. This is not limited in the present disclosure.

Figure 2:
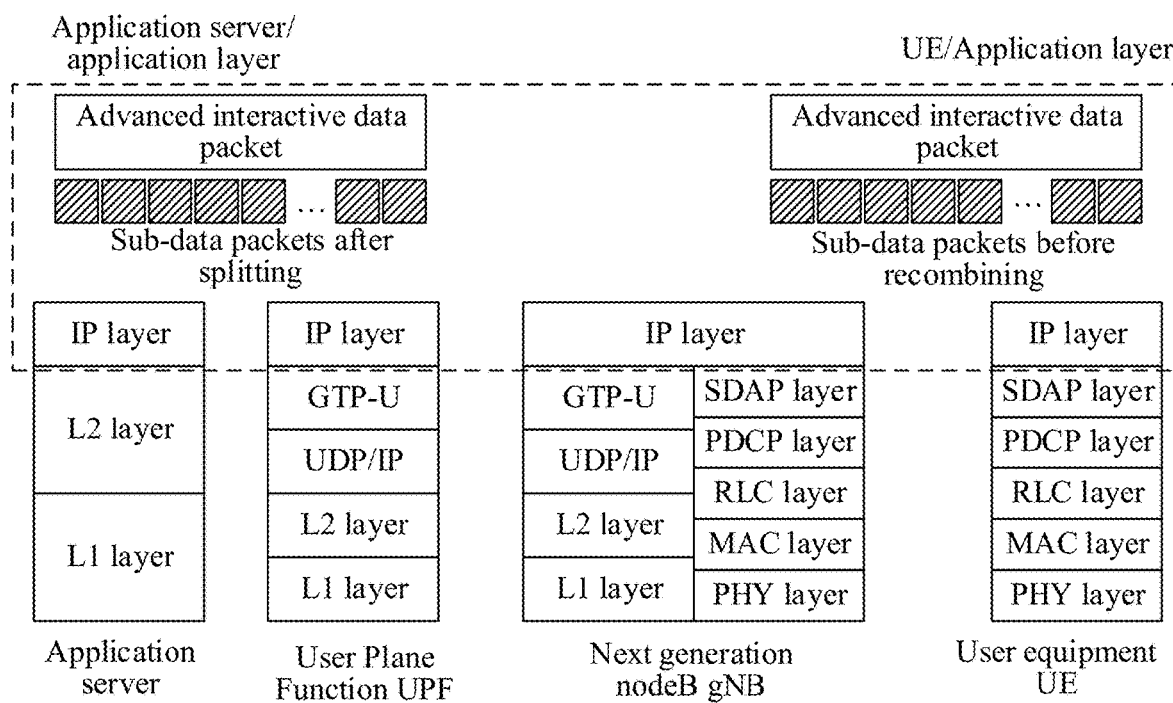
FIG. 2 is a schematic diagram of a transmission process according to certain embodiment(s) of the present disclosure.

In implementation scenarios of the various advanced interactive services, an advanced interactive data packet may be split into a plurality of sub-data packets during transmission because it is huge. In certain embodiment(s), as shown in FIG. 2, in a 5G system, a user plane includes an application server, a user plane function (UPF), a next generation nodeB (referred to as gNB), and a user equipment (UE). For some typical service scenarios, the transmission of the advanced interactive data packet is in a downlink direction, for example, from the application server to the UPF, and then is transmitted to the UE through the gNB. During transmission, the advanced interactive data packet is split in an application layer of the application server. After the split sub-data packets arrive at the UPF from the application server as an IP packet, the 5G system transmits the sub-data packets to a UE side through a PDU session, submits the sub-data packets upward level by level at the UE side from a protocol stack, and recombines and recovers the advanced interactive data packet.

In a system as shown in FIG. 2, layer L1 refers to a physical layer, which is configured to ensure that original data can be transmitted on various physical media; layer L2 refers to a data link layer, which provides a service to a network layer on the basis of a service provided by the physical layer; an Internal protocol (IP) layer is a network layer, which is configured to realize data transfer between two end systems; a UDP is a user datagram protocol; a GTP-U is a general packet radio service (GPRS) tunneling protocol; PHY is an abbreviation of physical; MAC is Media Access Control; RLC is radio link control; PDCP is a packet data convergence protocol; and SDAP is a service data adaptation protocol.

In the implementation scenarios, the advanced interactive data packet generated by the application layer may be segmented into a large number of sub-data packets for segmented transmission with a very low delay. Once the transmission of one of the sub-data packets does not meet certain transmission desirables, then the overall advanced interactive data packet cannot be recovered and represented at a receiving end in real time, so that the desirables of an advanced interactive high-bandwidth service cannot be met. The transmission of a large number of sub-data packet segments is a waste of valuable resources of the network. In certain embodiment(s), assuming that one advanced interactive data packet is split into 10 sub-data packets (even more sub-data packets), the probability of successful transmission of each sub-data packet is 0.99, then the probability of successful transmission of all of the 10 sub-data packets is 0.99$^{10}$, that is, 0.904. It can be seen that the probability of successful transmission of all sub-data packets obtained by splitting the overall advanced interactive data packet will be greatly reduced even if the probability of successful transmission of each sub-data packet is great during splitting one advanced interactive data packet into a plurality of sub-data packets. Moreover, a receiver cannot recover an advanced interactive data packet when or in response to a determination that a certain sub-data packet fails to transmit. There is no significance to continue to transmit the sub-data packets obtained by splitting the advanced interactive data packets. On this basis, the embodiments of the present disclosure provide the following solutions.

Figure 3:
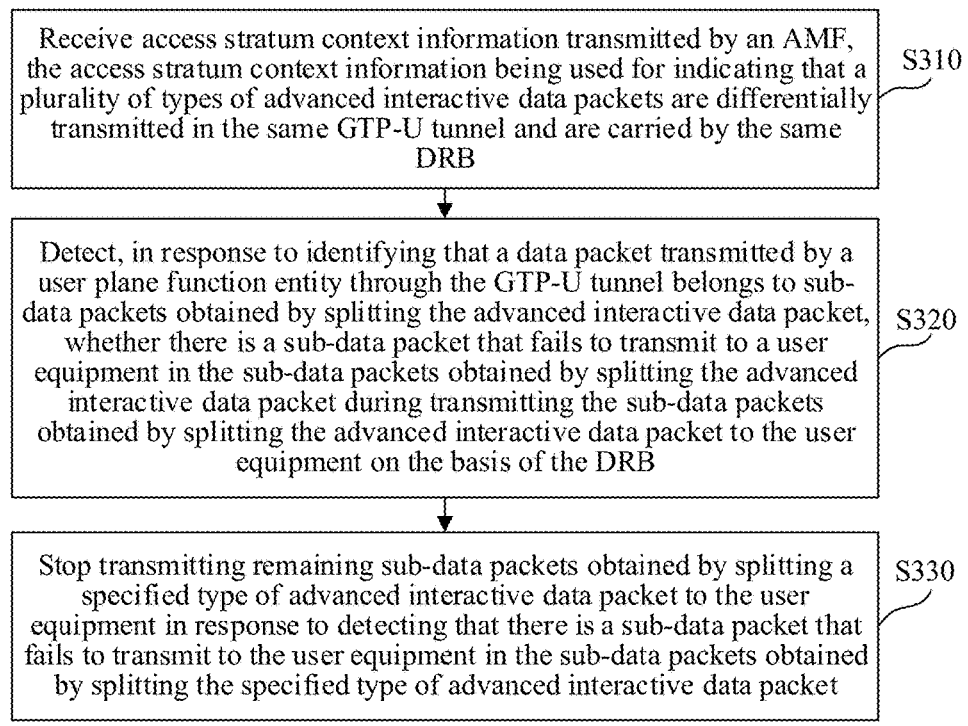
FIG. 3 is a schematic flowchart of a data transmission method according to certain embodiment(s) of the present disclosure.

FIG. 3 is a flowchart of a data transmission method according to an embodiment of the present disclosure. The data transmission method may be executed by a gNB. Referring to FIG. 3, the data transmission method at least includes steps S310 to S330, which are described in detail as follows:

S310. Receive access stratum context information transmitted by an AMF. The access stratum context information is used for indicating that a plurality of types of advanced interactive data packets are differentially transmitted in the same GTP-U tunnel and are carried by the same DRB.

When or in response to a determination that a gNB is that a control plane is separated from a user plane, that is, the gNB is separated into a gNB-centralized unit (gNB-CU) and a gNB-distributed unit (gNB-DU), and the gNB-CU serves as a control plane and the gNB-DU serves as a user plane, then the gNB in the embodiments of the present disclosure may be the gNB-DU.

In an embodiment of the present disclosure, the type of the advanced interactive data packet is determined according to at least one of the type or priority of the service content to be transmitted. For example, the type of the advanced interactive data packet may include an advanced interactive data packet corresponding to a key frame and an advanced interactive data packet corresponding to a non-key frame. The key frame may be I-frame, and the non-key frame may be P-frame and/or B-frame.

In an embodiment of the present disclosure, the operation that a plurality of types of advanced interactive data packets are differentially transmitted in the same GTP-U tunnel may be that a plurality of types of advanced interactive data packets are transmitted in different data streams in the same GTP-U tunnel. For example, a type of advanced interactive data packet corresponds to a stream identifier, and different types of advanced interactive data packets correspond to different stream identifiers.

Step S320. Detect, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB.

In an embodiment of the present disclosure, a user plane function entity may transmit a plurality of types of advanced interactive data packets in the same GTP-U tunnel, and different types of advanced interactive data packets may be distinguished by different stream identifiers. The gNB may identify whether the data packet is a sub-data packet obtained by splitting the advanced interactive data packet after receiving the data packet transmitted by the user plane function entity, and may also identify which type of advanced interactive data packet is on the basis of the stream identifier in a response to identifying that the data packet is the sub-data packet obtained by splitting the advanced interactive data packet.

In certain embodiment(s), assuming that there are two types of advanced interactive data packets, that is, an advanced interactive data packet corresponding to a key frame and an advanced interactive data packet corresponding to a non-key frame, then the user plane function entity may transmit the two types of advanced interactive data packets in the same GTP-U tunnel. In certain embodiment(s), the two types of advanced interactive data packets may be respectively split into sub-data packets for transmitting, and are distinguished by different stream identifiers.

In an embodiment of the present disclosure, a plurality of sub-data packets obtained by splitting the advanced interactive data packet include a start data packet and an end data packet. The start data packet includes first indication information, and the first indication information is used for indicating that the start data packet is the first transmitted sub-data packet of plurality of sub-data packets. The end data packet includes second indication information, and the second indication information is used for indicating the end data packet is the last transmitted sub-data packet of plurality of sub-data packets. According to the technical solution of the embodiment, whether the sub-data packet obtained by splitting the advanced interactive data packet is received may be determined by identifying the start data packet and the end data packet. For example, the data packets from the start data packet to the end data packet all belong to the sub-data packets obtained by splitting the advanced interactive data packet in a response to identifying the start data packet according to the first indication information contained in the start data packet.

In an embodiment of the present disclosure, whether the received data packet belongs to the sub-data packets obtained by splitting the advanced interactive data packet may be identified according to the indication information contained in a protocol field of the received data packet. In certain embodiment(s), for example, the start data packet in the sub-data packets obtained by splitting the advanced interactive data packet is added with the indication information used for indicating that it is a start data packet in the protocol field, and the end packet is added with the indication information used for indicating that it is an end packet in the protocol field, then the data packets from the start data packet to the end data packet all belong to the sub-data packets obtained by splitting the advanced interactive data packet after identifying the start data packet according to the protocol field of the data packet.

In an embodiment of the present disclosure, whether the received data packet belongs to the sub-data packets obtained by splitting the advanced interactive data packet may be identified according to the indication information contained in payload information of the received data packet. In certain embodiment(s), for example, the start data packet in the sub-data packets obtained by splitting the advanced interactive data packet is added with the indication information used for indicating that it is a start data packet to the payload information, and the end packet is added with the indication information used for indicating that it is an end packet to the payload information, then the data packets from the start data packet to the end data packet all belong to the sub-data packets obtained by splitting the advanced interactive data packet after identifying the start data packet according to the payload information of the data packet.

Continuing to refer to FIG. 3. Step S330. Stop transmitting the remaining sub-data packets obtained by splitting a specified type of advanced interactive data packet to the user equipment in response to detecting that there is a sub-data packet that fails to transmit to the user equipment in the sub-data packets obtained by splitting the specified type of advanced interactive data packet.

In an embodiment of the present disclosure, the specified type of advanced interactive data packet cannot be recovered by continuing transmitting the remaining sub-data packets obtained by splitting the specified type of advanced interactive data packet in response to detecting that there is a sub-data packet that fails to transmit to the user equipment in the sub-data packets obtained by splitting the specified type of advanced interactive data packet, so that the remaining sub-data packets may be stopped transmitting to the user equipment, which reduces the occupation of bandwidth and is beneficial to reducing the occupation of transmission resources during the transmission of the advanced interactive data packet.

In an embodiment of the present disclosure, the advanced interactive data packet is the specified type of advanced interactive data packet when or in response to a determination that there is a sub-data packet that fails to transmit to a user equipment in the sub-data packets obtained by splitting the advanced interactive data packet. In other words, the specified type of advanced interactive data packet is an advanced interactive data packet with a sub-data packet that fails to transmit.

In certain embodiment(s), assuming there are two types of advanced interactive data packets, that is, an advanced interactive data packet corresponding to a key frame and an advanced interactive data packet corresponding to a non-key frame. The advanced interactive data packet corresponding to the non-key frame is a specified type of advanced interactive data packet when or in response to a determination that there is a sub-data packet that fails to transmit in the advanced interactive data packet corresponding to the non-key frame. The advanced interactive data packet corresponding to the key frame is a specified type of advanced interactive data packet when or in response to a determination that there is a sub-data packet that fails to transmit in the advanced interactive data packet corresponding to the key frame.

In an embodiment of the present disclosure, the sub-data packets obtained by splitting various types of advanced interactive data packets may be detected during detecting whether there is a sub-data packet that fails to transmit to the user equipment in the sub-data packets obtained by splitting the advanced interactive data packet, and the detection processes of the sub-data packets obtained by splitting various types of advanced interactive data packets do not affect one another. Meanwhile, the transmission processes of the sub-data packets obtained by splitting various types of advanced interactive data packets also do not affect one another. For example, the sub-data packets obtained by splitting the advanced interactive data packet may be stopped transmitting to the user equipment when or in response to a determination that there is a sub-data packet that fails to transmit to the user equipment in the sub-data packets obtained by splitting a certain type of advanced interactive data packet, but this process does not affect the transmitting of the sub-data packets obtained by splitting other advanced interactive data packet.

In an embodiment of the present disclosure, the received sub-data packets obtained by splitting the specified type of advanced interactive data packet may also be discarded in response to detecting that there is a sub-data packet that fails to transmit to the user equipment in the sub-data packets obtained by splitting a specified type of advanced interactive data packet, so as to reduce the occupation of storage resources.

In an embodiment of the present disclosure, feedback information may be transmitted to a user plane function entity in response to detecting that there is a sub-data packet that fails to transmit to the user equipment in the sub-data packets obtained by splitting a specified type of advanced interactive data packet. The feedback information is used for instructing the user plane function entity to stop transmitting the sub-data packets obtained by splitting the advanced interactive data packet. According to the technical solution of the embodiment, the feedback information may be transmitted, in response to detecting that there is a sub-data packet that fails to transmit during transmitting the sub-data packets to the user equipment, to the user plane function entity, so as to instruct the user plane function entity to stop transmitting the remaining sub-data packets, thereby reducing the occupation of the transmission resources.

In an embodiment of the present disclosure, the feedback information is transmitted to the user plane function entity when or in response to a determination that all sub-data packets obtained by splitting the specified type of advanced interactive data packet have not been received completely. The feedback information may not be transmitted to the user plane function entity when or in response to a determination that all sub-data packets obtained by splitting the specified type of advanced interactive data packet have been received completely.

In an embodiment of the present disclosure, the sub-data packets obtained by splitting the specified type of advanced interactive data packet are stopped transmitting to the user equipment, and the sub-data packets obtained by splitting the specified type of advanced interactive data packet are discarded in response to not completely receiving all sub-data packets obtained by splitting the specified type of advanced interactive data packet transmitted by the user plane function entity within a set time length. In the technical solution of the embodiment, the advanced interactive data packet may be a data packet with certain time limit desirable. It indicates that the advanced interactive data packet has exceeded the time limit desirable when or in response to a determination that all sub-data packets obtained by splitting the advanced interactive data packet transmitted by the user plane function entity are not completely received within a set time length. At this moment, there is no need to transmit the sub-data packet to the user equipment. In certain embodiment(s), when or in response to a determination that all sub-data packets obtained by splitting the specified type of advanced interactive data packet transmitted by the user plane function entity are not completely received within the set time length, it may also be because the user plane function entity stops transmitting after detecting that there is a sub-data packet transmission error. At this moment, it also indicates that there is no need to transmit the sub-data packet to the user equipment. The sub-data packet may also be stopped transmitting to the user equipment, and the received sub-data packet may also be discarded.

Figure 4:
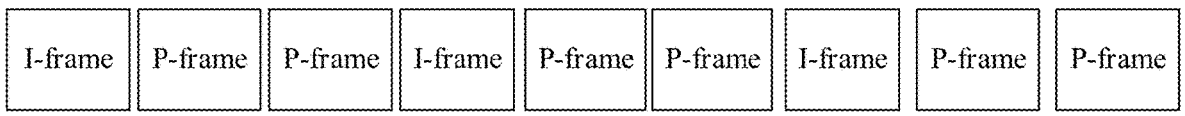
FIG. 4 is a schematic diagram of a division structure according to certain embodiment(s) of the present disclosure.

In an embodiment of the present disclosure, as shown in FIG. 4, various types of advanced interactive data packets in the embodiments may include: an advanced interactive data packet corresponding to a key frame (that is, I-frame as shown in FIG. 4) and an advanced interactive data packet corresponding to a non-key frame (that is, P-frame as shown in FIG. 4). Since the recovery of the non-key frame may depend on the key frame, the advanced interactive data packet corresponding to the non-key frame and associated with the key frame is stopped transmitting to the user equipment, and/or the received advanced interactive data packet corresponding to the non-key frame and associated with the specified key frame is discarded in response to detecting that there is a data packet that fails to transmit to the user equipment in the sub-data packets obtained by splitting the advanced interactive data packet corresponding to the specified key frame. According to the technical solution of the embodiment, when or in response to a determination that there is a sub-data packet that fails to transmit in the sub-data packets obtained by splitting the advanced interactive data packet corresponding to the specified key frame, not only other sub-data packets obtained by splitting the advanced interactive data packet corresponding to the specified key frame are stopped transmitting, but also the transmission of the advanced interactive data packet corresponding to the non-key frame and associated with the specified key frame is to be stopped, In certain embodiment(s), the transmission of the sub-data packets obtained by splitting the associated advanced interactive data packet corresponding to the non-key frame is stopped, so that the occupation of bandwidth by invalid data packets can be reduced, which is beneficial to reducing the occupation of transmission resources by the advanced interactive data packet during transmission.

Figure 5:
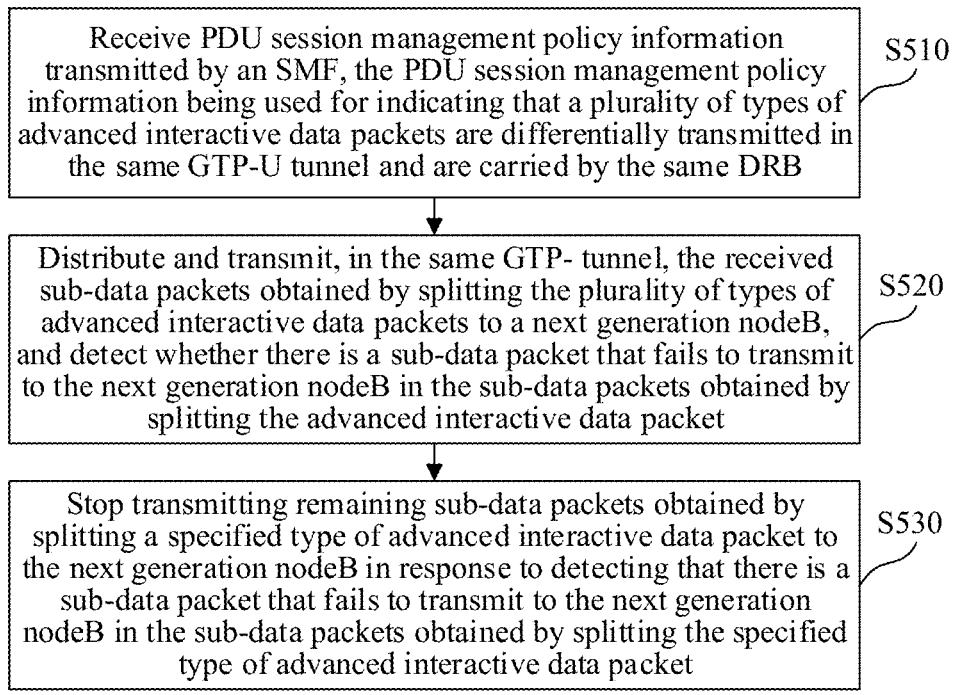
FIG. 5 is a schematic flowchart of a data transmission method according to certain embodiment(s) of the present disclosure.

FIG. 3 describes the data transmission method according to an embodiment of the present disclosure from the perspective of a next generation nodeB. The data transmission method in this embodiment of the present disclosure is described below from the perspective of a user plane function entity:

FIG. 5 is a flowchart of a data transmission method according to an embodiment of the present disclosure. The data transmission method may be executed by the user plane function entity. Referring to FIG. 5, the data transmission method at least includes steps S510 to S530, which are described in detail as follows:

Step S510. Receive PDU session management policy information transmitted by an SMF, the PDU session management policy information being used for indicating that a plurality of types of advanced interactive data packets are differentially transmitted in the same GTP-U tunnel and are carried by the same DRB.

In an embodiment of the present disclosure, the type of the advanced interactive data packet is determined according to at least one of the type or priority of the service content to be transmitted. For example, the type of the advanced interactive data packet may include an advanced interactive data packet corresponding to a key frame and an advanced interactive data packet corresponding to a non-key frame. The key frame may be I-frame, and the non-key frame may be P-frame and/or B-frame.

Step S520. Distribute and transmit, in the same GTP-U tunnel, the received sub-data packets obtained by splitting the plurality of types of advanced interactive data packets to a next generation nodeB, and detect whether there is a sub-data packet that fails to transmit to the next generation nodeB in the sub-data packets obtained by splitting the advanced interactive data packet.

In an embodiment of the present disclosure, a plurality of sub-data packets obtained by splitting the advanced interactive data packet include a start data packet and an end data packet.

In an embodiment of the present disclosure, whether the received data packet belongs to the sub-data packets obtained by splitting the advanced interactive data packet may be identified according to the indication information contained in a protocol field of the received data packet.

In an embodiment of the present disclosure, whether the received data packet belongs to the sub-data packets obtained by splitting the advanced interactive data packet may be identified according to the indication information contained in payload information of the received data packet.

Step S530. Stop transmitting the remaining sub-data packets obtained by splitting a specified type of advanced interactive data packet to the next generation nodeB in response to detecting that there is a sub-data packet that fails to transmit to the next generation nodeB in the sub-data packets obtained by splitting the specified type of advanced interactive data packet.

In this embodiment of the present disclosure, there is no significance to continue to transmit the sub-data packets obtained by splitting the specified type of advanced interactive data packet in response to detecting that there is a sub-data packet that fails to transmit to the next generation nodeB in the sub-data packets obtained by splitting the specified type of advanced interactive data packet, so that the remaining sub-data packets may be stopped transmitting to the next generation nodeB, which reduces the occupation of bandwidth and is beneficial to reducing the occupation of transmission resources by the advanced interactive data packet during transmission.

In an embodiment of the present disclosure, the received sub-data packets obtained by splitting the specified type of advanced interactive data packet may also be discarded in response to detecting that there is a sub-data packet that fails to transmit to the next generation nodeB in the sub-data packets obtained by splitting a specified type of advanced interactive data packet, so as to reduce the occupation of storage resources.

In an embodiment of the present disclosure, feedback information may be transmitted to an application server in response to detecting that there is a sub-data packet that fails to transmit to the next generation nodeB in the sub-data packets obtained by splitting a specified type of advanced interactive data packet. The feedback information is used for instructing the application server to stop transmitting the sub-data packets obtained by splitting the advanced interactive data packet. According to the technical solution of the embodiment, the feedback information may be transmitted to the application server to instruct the application server to stop transmitting the remaining sub-data packets to avoid the occupation of transmission resource in response to detecting that there is a sub-data packet that fails to transmit during transmitting the sub-data packets to the next generation nodeB.

In an embodiment of the present disclosure, the operation that the feedback information is transmitted to the application server is performed when or in response to a determination that all sub-data packets obtained by splitting a specified type of advanced interactive data packet are not completely received. The feedback information does not need to be transmitted to the application server when or in response to a determination that all sub-data packets obtained by splitting the specified type of advanced interactive data packet have been received.

In an embodiment of the present disclosure, the sub-data packets obtained by splitting the specified type of advanced interactive data packet are stopped transmitting to the next generation nodeB, and the sub-data packets obtained by splitting the specified type of advanced interactive data packet are discarded in response to not completely receiving all sub-data packets obtained by splitting the specified type of advanced interactive data packet transmitted by the application server within a set time length. In the technical solution of the embodiment, the advanced interactive data packet may be a data packet with a time limit desirable. It indicates that the advanced interactive data packet has exceeded the time limit desirable in response to not completely receiving all sub-data packets obtained by splitting the advanced interactive data packet transmitted by the application server within a set time length. At this moment, there is no need to transmit the sub-data packet to the next generation nodeB. In certain embodiment(s), when or in response to a determination that all sub-data packets obtained by splitting the specified type of advanced interactive data packet transmitted by the application server are not completely received within the set time length, it may also be because the application server stops transmitting after detecting that there is a sub-data packet transmission error. At this moment, it also indicates that there is no need to transmit the sub-data packet to the next generation nodeB.

The sub-data packet may also be stopped transmitting to the next generation nodeB, and the received sub-data packet may also be discarded.

In an embodiment of the present disclosure, when or in response to a determination that the advanced interactive data packet includes: an advanced interactive data packet corresponding to a key frame and an advanced interactive data packet corresponding to a non-key frame. Since the recovery of the non-key frame may depend on the key frame, the advanced interactive data packet corresponding to the non-key frame and associated with the key frame is stopped transmitting to the next generation nodeB, and/or the received advanced interactive data packet corresponding to the non-key frame and associated with the specified key frame is discarded in response to detecting that there is a data packet that fails to transmit to the next generation nodeB in the sub-data packets obtained by splitting the advanced interactive data packet corresponding to the specified key frame. According to the technical solution of the embodiment, when or in response to a determination that there is a sub-data packet that fails to transmit in the sub-data packets obtained by splitting the advanced interactive data packet corresponding to the specified key frame, not only other sub-data packets obtained by splitting the advanced interactive data packet corresponding to the specified key frame are stopped transmitting, but also the transmission of the advanced interactive data packet corresponding to the non-key frame and associated with the specified key frame is to be stopped, the transmission of the sub-data packets obtained by splitting the associated advanced interactive data packet corresponding to the non-key frame is stopped, so that the occupation of bandwidth by invalid data packets can be reduced, which is beneficial to reducing the occupation of transmission resources by the advanced interactive data packet during transmission.

Figure 6:
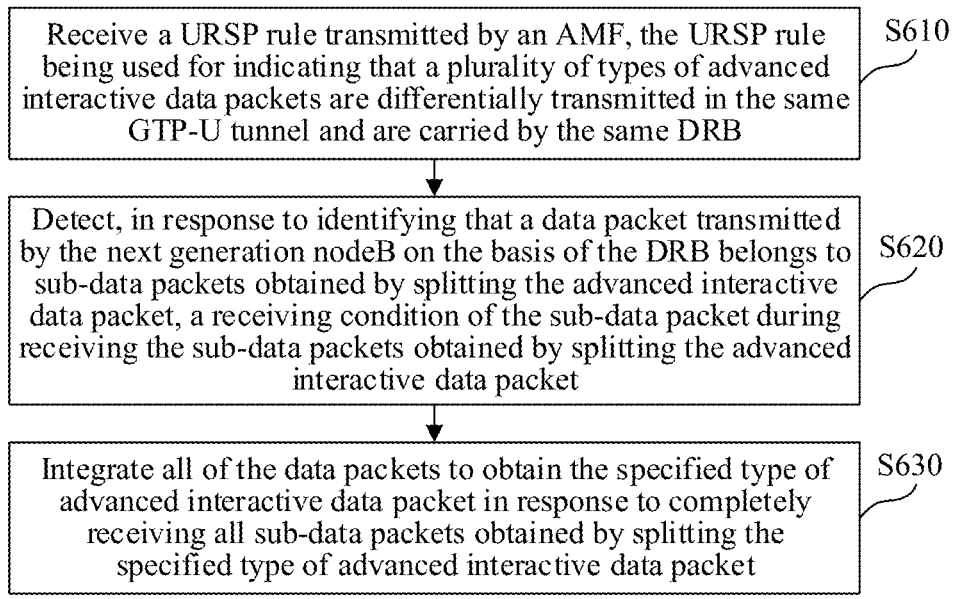
FIG. 6 is a schematic flowchart of a data transmission method according to certain embodiment(s) of the present disclosure.

The data transmission method in this embodiment of the present disclosure is described from the perspective of a user equipment:

FIG. 6 is a flowchart of a data transmission method according to an embodiment of the present disclosure. The data transmission method may be executed by user equipment. Referring to FIG. 6, the data transmission method at least includes steps S610 to S630, which are described in detail as follows:

Step S610. Receive a URSP rule transmitted by an AMF. The URSP rule being used for indicating that a plurality of types of advanced interactive data packets are differentially transmitted in the same GTP-U tunnel and are carried by the same DRB.

Step S620. Detect, in response to identifying that a data packet transmitted by the next generation nodeB on the basis of the DRB belongs to sub-data packets obtained by splitting the advanced interactive data packet, a receiving condition of the sub-data packet during receiving the sub-data packets obtained by splitting the advanced interactive data packet.

In an embodiment of the present disclosure, a plurality of sub-data packets obtained by splitting the advanced interactive data packet include a start data packet and an end data packet.

In an embodiment of the present disclosure, whether the received data packet belongs to the sub-data packets obtained by splitting the advanced interactive data packet may be identified according to the indication information contained in a protocol field of the received data packet.

In an embodiment of the present disclosure, whether the received data packet belongs to the sub-data packets obtained by splitting the advanced interactive data packet may be identified according to the indication information contained in payload information of the received data packet.

Step S630. Integrate all of the data packets to obtain the specified type of advanced interactive data packet in response to receiving all sub-data packets obtained by splitting the specified type of advanced interactive data packet.

In an embodiment of the present disclosure, all sub-data packets may be sequentially integrated according to the sequence of these sub-data packets during integrating all sub-data packets obtained by splitting the specified type of advanced interactive data packet, and a complete advanced interactive data packet is finally obtained.

In an embodiment of the present disclosure, the sub-data packets obtained by splitting the specified type of advanced interactive data packet may be discarded when or in response to a determination that all sub-data packets obtained by splitting the specified type of advanced interactive data packet are not received by user equipment within a set time length. In the embodiment, the advanced interactive data packet may be a data packet with a time limit desirable. It indicates that the advanced interactive data packet has exceeded the time limit desirable in response to not completely receiving all sub-data packets obtained by splitting the advanced interactive data packet within a set time length. At this moment, there is no need to receive the sub-data packet and perform integrating processing, so the received sub-data packet may be discarded. In certain embodiment(s), when or in response to a determination that all sub-data packets obtained by splitting the specified type of advanced interactive data packet are not completely received within the set time length, it may also be because the next generation nodeB stops transmitting after detecting that there is a sub-data packet transmission error. At this moment, the received sub-data packet may also be discarded.

In an embodiment of the present disclosure, feedback information is transmitted to the application server that transmits the specified type of advanced interactive data packet to indicate that the transmission of the advanced interactive data packet fails in response to not completely receiving all sub-data packets obtained by splitting the specified type of advanced interactive data packet within a set time length. According to the technical solution of the embodiment, the feedback information may be transmitted to the application server to indicate that the transmission of the advanced interactive data packet fails to the application server in response to detecting that all sub-data packets obtained by splitting the advanced interactive data packet are not completely received by the user equipment within a set time length, so that the application server confirms whether to retransmit.

Figure 7:
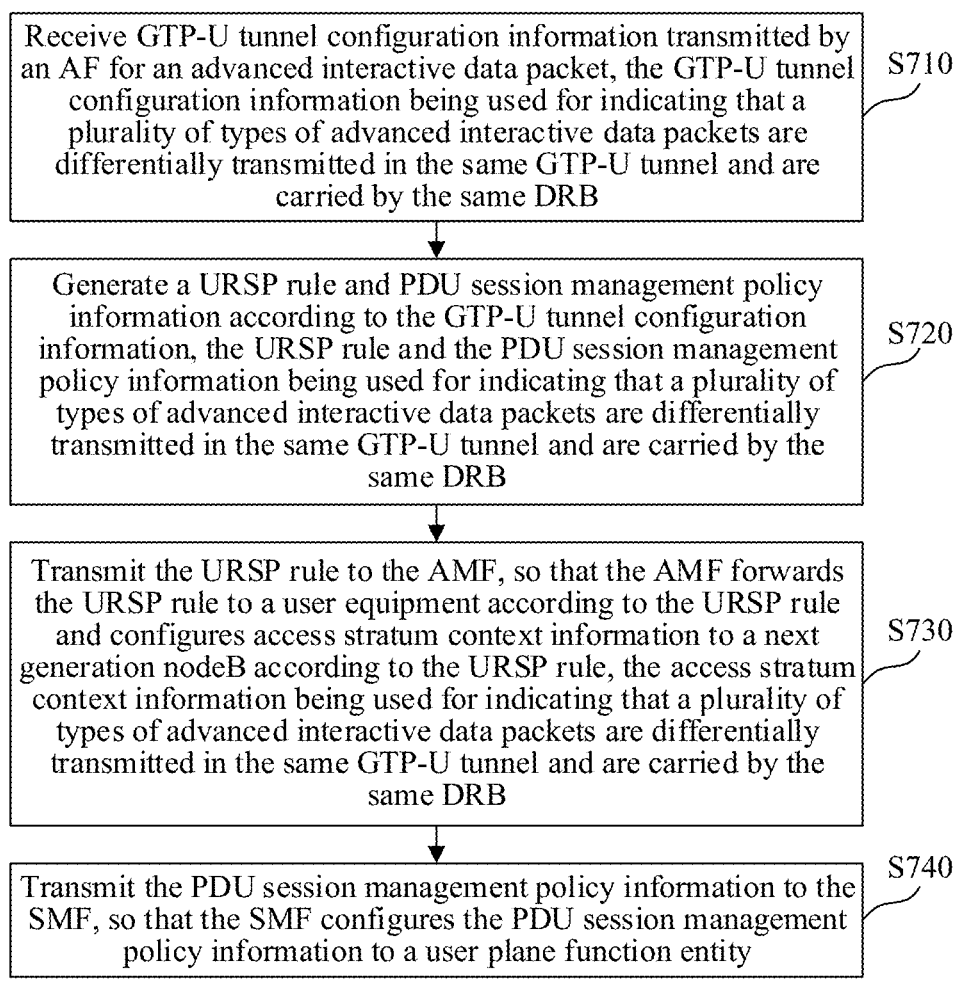
FIG. 7 is a schematic flowchart of a data transmission method according to certain embodiment(s) of the present disclosure.

The data transmission method in this embodiment of the present disclosure is described from the perspective of a policy control function (PCF):

FIG. 7 is a flowchart of a data transmission method according to an embodiment of the present disclosure. The data transmission method may be executed by a PCF. Referring to FIG. 7, the data transmission method at least includes steps S710 to S740, which are described in detail as follows:

S710. Receive GTP-U tunnel configuration information transmitted by an AF for an advanced interactive data packet, the GTP-U tunnel configuration information being used for indicating that a plurality of types of advanced interactive data packets are differentially transmitted in the same GTP-U tunnel and are carried by the same DRB.

In an embodiment of the present disclosure, the AF may directly transmit the GTP-U tunnel configuration information for the advanced interactive data packet to the PCF, or the AF may also transmit the GTP-U tunnel configuration information for the advanced interactive data packet to the PCF through a network exposure function (NEF).

Step S720. Generate a URSP rule and PDU session management policy information according to the GTP-U tunnel configuration information, the URSP rule and the PDU session management policy information being used for indicating that a plurality of types of advanced interactive data packets are differentially transmitted in the same GTP-U tunnel and are carried by the same DRB.

Step S730. Transmit the URSP rule to the AMF, so that the AMF forwards the URSP rule to a user equipment and configures access stratum context information to a next generation nodeB according to the URSP rule, the access stratum context information being used for indicating that a plurality of types of advanced interactive data packets are differentially transmitted in the same general packet radio service tunneling protocol-user plane (GTP-U) tunnel and are carried by the same data radio bearer (DRB).

In an embodiment of the present disclosure, the AMF may directly forward the URSP rule to the user equipment, meanwhile, and the AMF may generate the access stratum context information configured to the next generation nodeB according to the URSP rule. Then, the access stratum context information is transmitted to the next generation nodeB by the AMF.

Step S740. Transmit the PDU session management policy information to the SMF, so that the SMF configures the PDU session management policy information to a user plane function entity.

In an embodiment of the present disclosure, the SMF may directly forward the PDU session management policy information to the user plane function entity.

The technical solutions of the embodiments of the present disclosure are respectively described in the embodiments from the perspectives of the user plane function entity, the next generation nodeB, the user equipment, and the PCF. The technical solutions of the embodiments of the present disclosure are further described from the perspective of interaction among various entities.

In an embodiment of the present disclosure, the application server can classify the advanced interactive data packets into two types in an application layer. It can be understood that two types are taken as examples in the embodiment. There may be more types, such as an I-frame stream and a P-frame stream, in other embodiments of the present disclosure, and the advanced interactive data packets are transmitted by using the two streams respectively. This type of information is placed in a message header through an interlayer interaction mechanism. In other embodiments of the present disclosure, the advanced interactive data packets may also be classified on the basis of other rules rather than I-frame and P-frame, for example, on the basis of the priority of audio and video stream content and the like.

Figure 8:
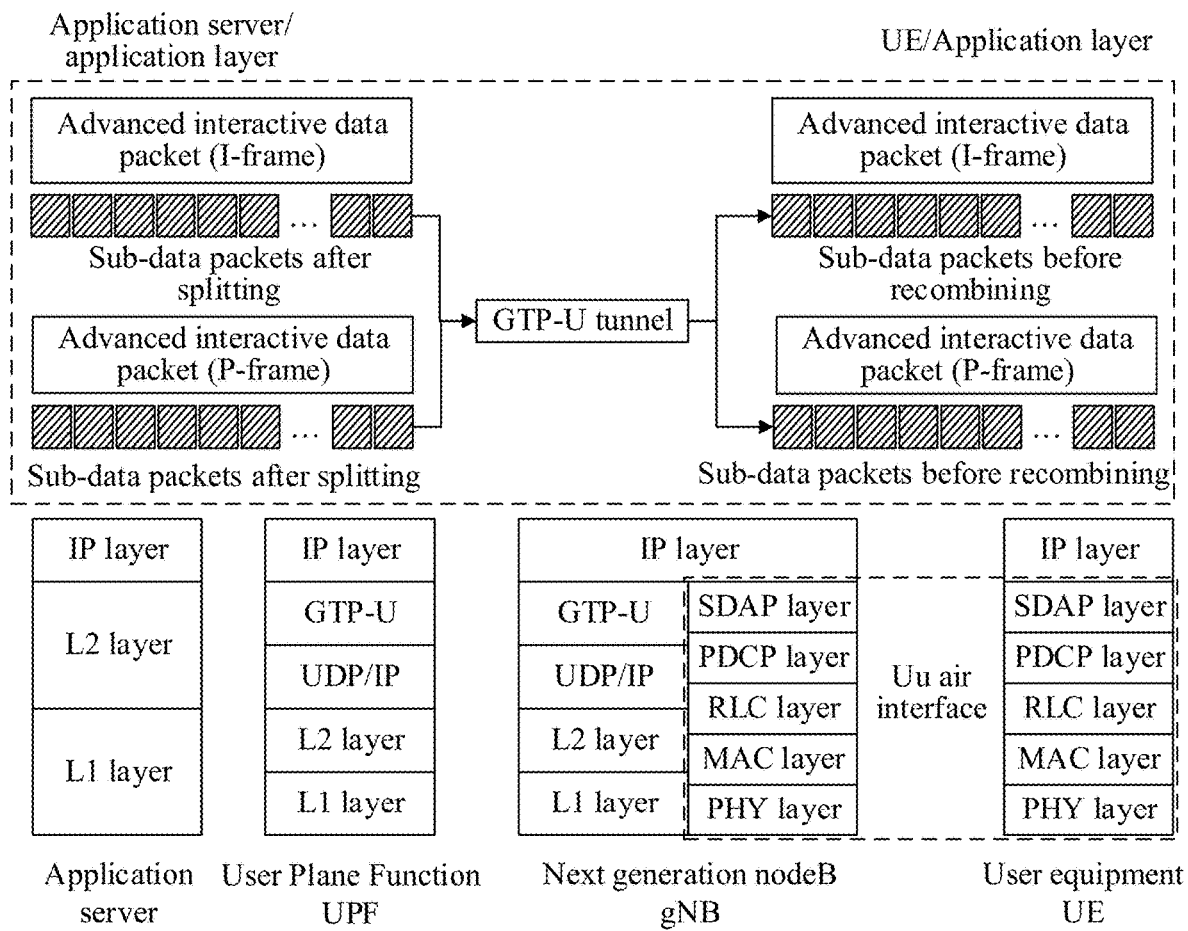
FIG. 8 is a schematic diagram of a transmission process according to certain embodiment(s) of the present disclosure.

In an embodiment of the present disclosure, an AF may interact with a PCF, and then the PCF interacts with various network elements, such as an AMF and an SMF, so as to configure a GTP-U tunnel for two streams. As shown in FIG. 8, the I-frame advanced interactive data packet and the P-frame advanced interactive data packet distinguished by the application layer are placed in a GTP-U tunnel after being split, and are subjected to downlink transmission by using the same DRB after arriving at a gNB, so as to maintain a one-to-one correspondence with the GTP-U tunnel and the DRB in a suitable PDU session mechanism, but distinguish packets from different streams by using a differentiation mechanism in the GTP-U tunnel. Meanwhile, the gNB gives priority to ensuring the transmission of an I-frame data stream (that is, a sub-data packet obtained by splitting the I-frame advanced interactive data packet) during scheduling data transmission. All sub-data packets obtained by splitting the I-frame advanced interactive data packet are discarded and all sub-data packets split from a subsequent P-frame advanced interactive data packet when or in response to a determination that the I-frame data stream losses, because an image may not be recovered even if the P-frame is received when or in response to a determination that the I-frame losses.

In an embodiment of the present disclosure, the sub-data packets obtained by splitting the advanced interactive data packet may be marked with start and end after any type of the advanced interactive data packet is split. Subsequent sub-data packets do not need to be transmitted and may be discarded on the basis of the marked start sub-data packet and the end sub-data packet when or in response to a determination that part sub-data packets of the N sub-data packets split from one advanced interactive data packet fail to transmit.

Figure 9:
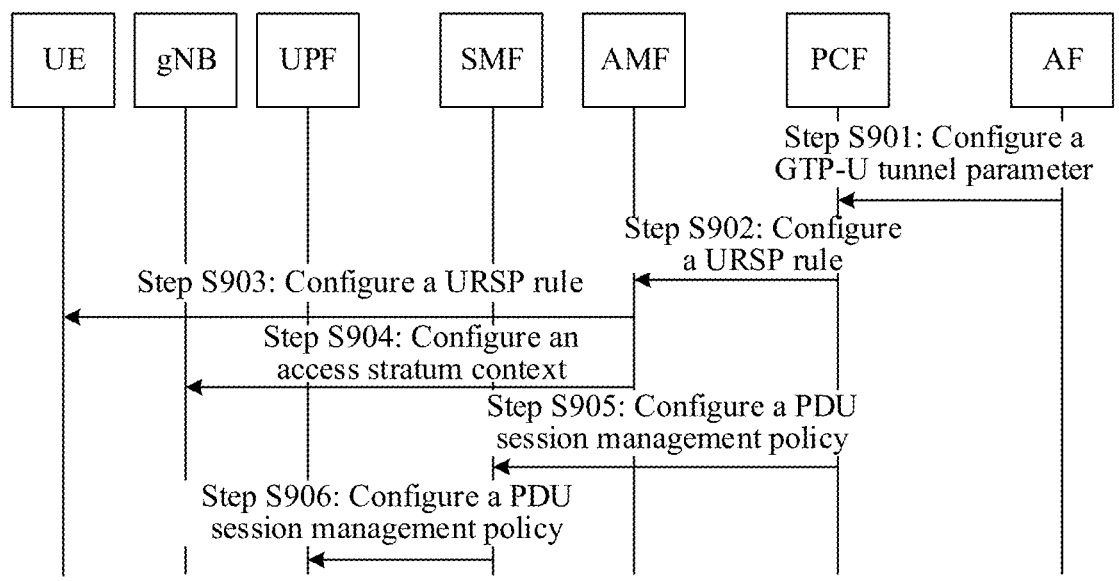
FIG. 9 is a schematic configuration flowchart of a control plane according to certain embodiment(s) of the present disclosure.

In an embodiment of the present disclosure, a configuration process of a control plane may be performed before managing a transmission process of sub-data packets, so that a UE and various network elements acquire transmission parameters of the advanced interactive data packet. A specific process is as shown in FIG. 9, which includes the following steps:

Step S901. An AF configures a GTP-U tunnel parameter to a PCF.

In an embodiment of the present disclosure, the AF may configure the GTP-U tunnel parameter by configuring a PDU session policy of an advanced interactive data packet to the PCF. In certain embodiment(s), the AF may directly transmit the PDU session policy of the advanced interactive data packet to the PCF, or the AF may also transmit the PDU session policy of the advanced interactive data packet to the PCF through an NEF. The GTP-U tunnel parameter is that a plurality of types of advanced interactive data packets are distributed and transmitted in the same GTP-U tunnel and are carried by the same DRB.

Step S902. The PCF configures a URSP rule to an AMF.

In an embodiment of the present disclosure, the URSP configured by the PCF to the AMF is associated with a PDU session, including that: a plurality of types of advanced interactive data packets are distributed and transmitted in the same GTP-U tunnel and are carried by the same DRB.

Step S903. The AMF configures a URSP rule to a UE.

In an embodiment of the present disclosure, the operation that the AMF configures a URSP rule to a UE includes that: a plurality of types of advanced interactive data packets are distributed and transmitted in the same GTP-U tunnel and are carried by the same DRB.

Step S904. The AMF configures an access stratum context for a gNB.

In an embodiment of the present disclosure, the access stratum (AS) context configured by the AMF to the gNB is associated with a PDU session, which includes that: a plurality of types of advanced interactive data packets are distributed and transmitted in the same GTP-U tunnel and are carried by the same DRB.

Step S905. The PCF configures a PDU session management policy to an SMF.

In an embodiment of the present disclosure, the PDU session management policy includes that a plurality of types of advanced interactive data packets are distributed and transmitted in the same GTP-U tunnel and are carried by the same DRB.

Step S906. The SMF configures a PDU session management policy to a UPF.

After the configuration of the control plane is completed, the segmented transmission of the advanced interactive data packets (that is, splitting into sub-data packets for transmission) may follow the following principles: for a plurality of IP sub-packets formed after a huge IP packet (that is, an advanced interactive data packet) is split, the data packet that has been transmitted successfully is to be discarded even if it is received by a receiving end when or in response to a determination that part IP sub-packets fail to transmit. A transmitting end is also to be discarded when or in response to a determination that there are still part IP sub-packets that have not been transmitted, and the transmitting of the next advanced interactive data packet is started as soon as possible.

A retransmitted data packet may be marked as a new advanced interactive data packet for transmitting when or in response to a determination that an application server or user equipment retransmits the advanced interactive data packet in an application layer. A specific transmission mode is consistent with the mode limited in the embodiment of the present disclosure.

Figure 10:
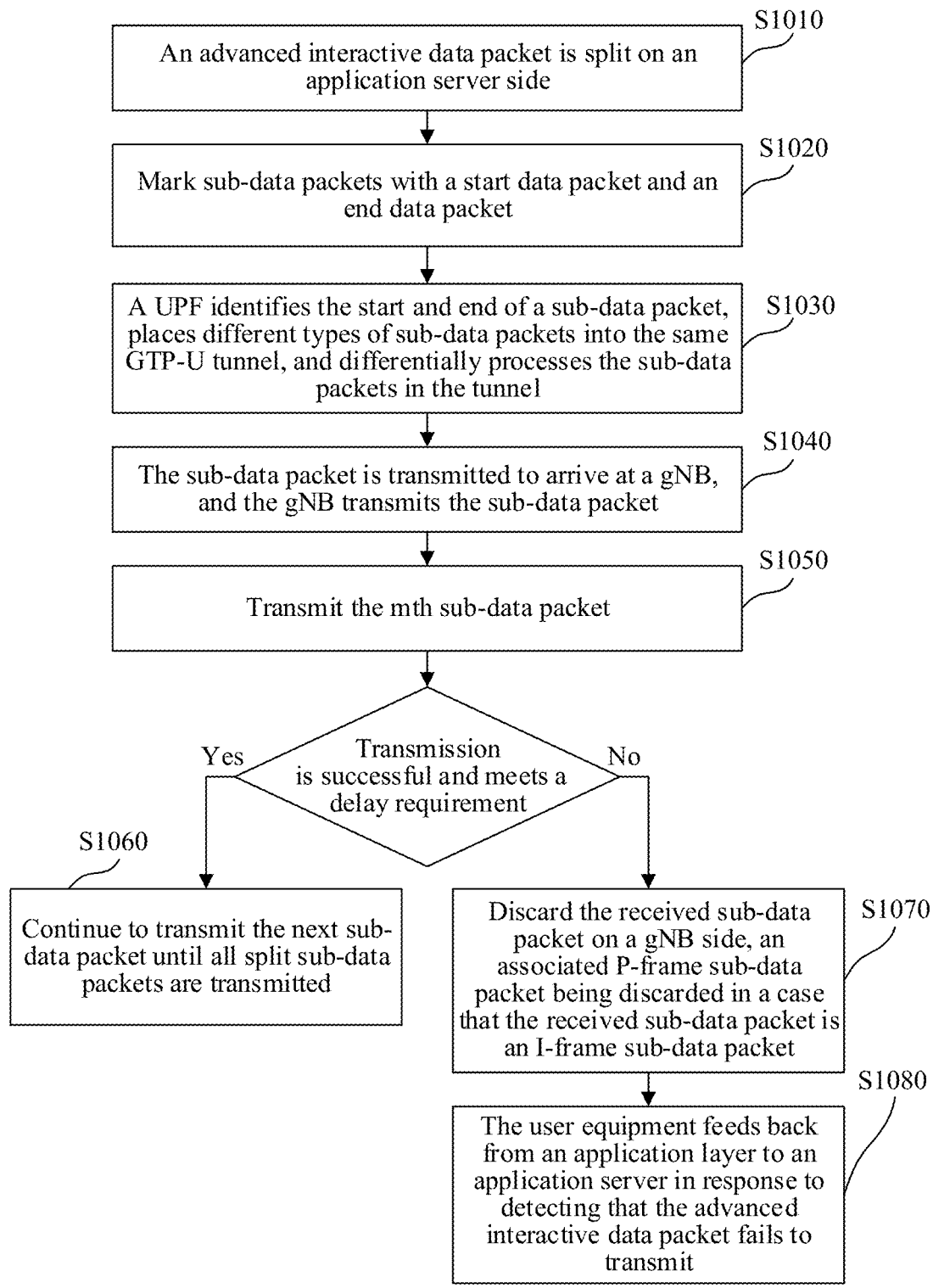
FIG. 10 is a schematic diagram of a transmission flowchart according to certain embodiment(s) of the present disclosure.

In an embodiment of the present disclosure, as shown in FIG. 10, the data transmission method according to an embodiment of the present disclosure may include the following steps.

Step S1010. An advanced interactive data packet is split on an application server side.

In an embodiment of the present disclosure, an application server may determine a sub-packet size according to a set sub-data packet size or the state of a network, and then split the advanced interactive data packet to obtain a plurality of sub-data packets according to the sub-packet size.

Step S1020. The sub-data packets obtained by splitting are marked with a start data packet and an end data packet.

In an embodiment of the present disclosure, indication information may be added to the start data packet and the end data packet to mark which sub-data packet is the start data packet and which sub-data packet is the end data packet. In certain embodiment(s), the indication information may be added to a protocol field or payload information of a data packet, for example, the indication information is added to the protocol field of a GTP-U tunnel protocol.

Step S1030. A UPF identifies the start and end of a sub-data packet, simultaneously, places different types of sub-data packets into the same GTP-U tunnel, and performs differentiation processing in the tunnel.

In an embodiment of the present disclosure, the UPF may identify a start data packet and an end data packet in the sub-data packets in a process that the application server transmits the sub-data packets obtained by splitting to the UPF.

Step S1040. The sub-data packets are transmitted to arrive at a gNB, and the gNB transmits the sub-data packets.

In an embodiment of the present disclosure, the UPF transmits the sub-data packets to the gNB after receiving the sub-data packets transmitted by the application server, and then the gNB transmits the sub-data packets to user equipment. The gNB may be augmented to identify the indication information in the sub-data packets, so as to determine the start data packet and the end data packet, thereby identifying a series of sub-data packets obtained by splitting the advanced interactive data packet. Meanwhile, the gNB places different types of sub-data packets received from the same GTP-U tunnel into the same DRB and transmits to the user equipment.

Step S1050. The gNB transmits the mth sub-data packet to the user equipment. If the mth sub-data packet is transmitted successfully, then step S1060 is performed. If the mth sub-data packet fails to transmit, then step S1070 is performed.

In an embodiment of the present disclosure, the gNB may transmit the sub-data packets to the user equipment through a Uu interface. Meanwhile, whether the data is transmitted successfully or fails to transmit may be determined through protocols of a Uu interface, such as a PDCP and an RLC.

Step S1060. Continue to transmit the next sub-data packet until all split sub-data packets are transmitted when or in response to a determination that the data is transmitted successfully.

Step S1070. Discard the received sub-data packets on a gNB side if the data fails to transmit. At this moment, other sub-data packets transmitted by the UPF are not transmitted to the user equipment. The sub-data packets obtained by splitting an associated P-frame advanced interactive data packet are also discarded when or in response to a determination that the I-frame advanced interactive data packet fails to transmit.

Step S1080. The user equipment feeds back from an application layer to the application server in response to detecting that the advanced interactive data packet fails to transmit. In certain embodiment(s), the user equipment may determine that the advanced interactive data packet fails to transmit in response to not completely receiving all sub-data packets of the advanced interactive data packet within a certain time limit. The information fed back to the application server is used for indicating that the advanced interactive data packet has failed to transmit.

Figure 11:
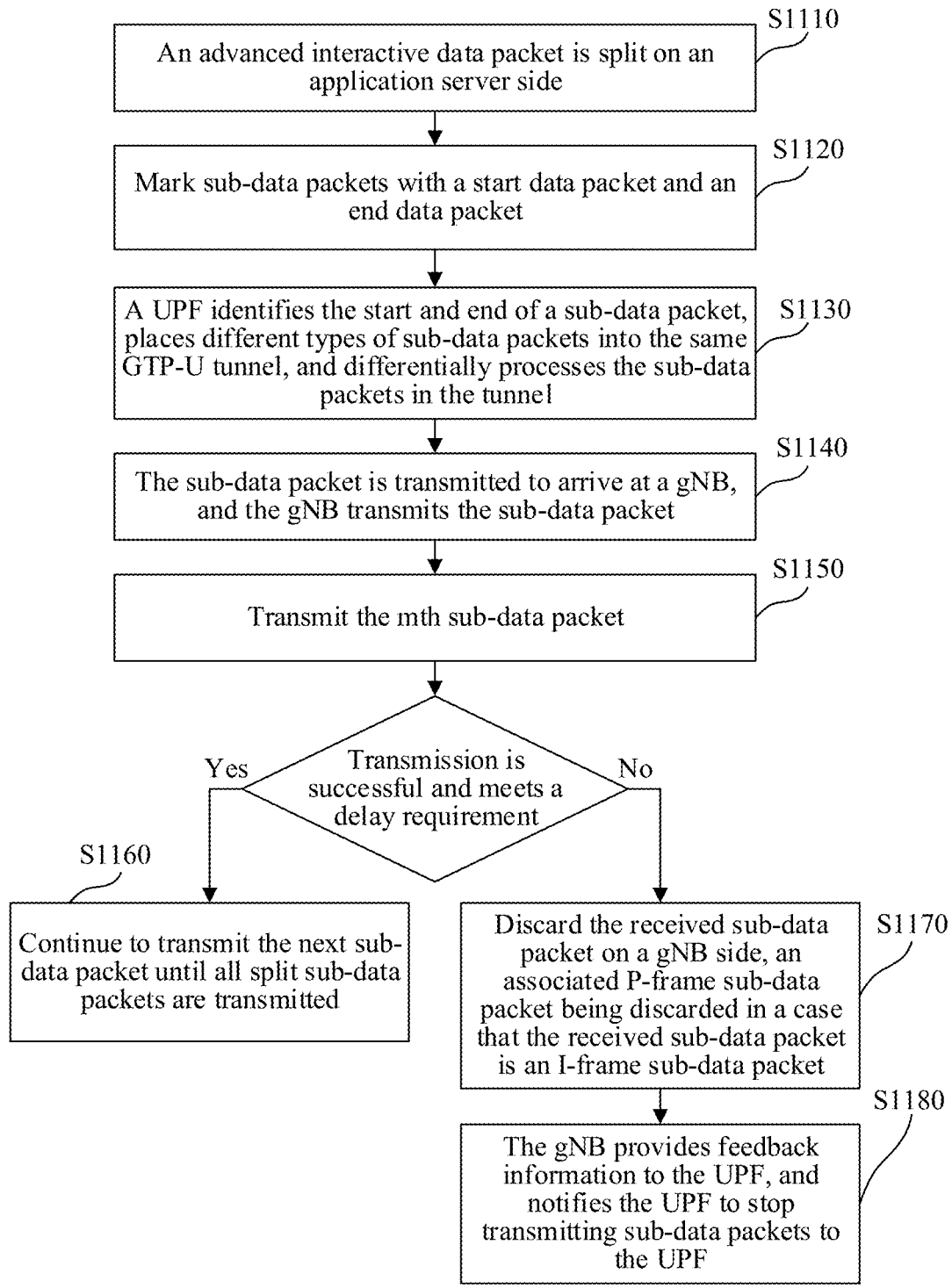
FIG. 11 is a schematic diagram of a transmission flowchart according to certain embodiment(s) of the present disclosure.

The technical solution of the embodiment as shown in FIG. 10 does not desire that the gNB indicates a transmission condition of the advanced interactive data packet to the UPF, but the user equipment may indicate that the advanced interactive data packet fails to transmit for the application layer to the application server. In another embodiment of the present disclosure, as shown in FIG. 11, the data transmission method includes the following steps:

Step S1110. An advanced interactive data packet is split on an application server side.

In an embodiment of the present disclosure, an application server may determine a sub-packet size according to a set sub-data packet size or the state of a network, and then split the advanced interactive data packet to obtain a plurality of sub-data packets according to the sub-packet size.

Step S1120. Mark the sub-data packets obtained by splitting with a start data packet and an end data packet.

In an embodiment of the present disclosure, indication information may be added to the start data packet and the end data packet to mark which is sub-data packet is the start data packet and which sub-data packet is the end data packet. In certain embodiment(s), the indication information may be added to a protocol field or payload information of a data packet, for example, the indication information is added to the protocol field of a GTP-U tunnel protocol.

Step S1130. A UPF identifies the start and end of a sub-data packet, simultaneously, places different types of sub-data packets into the same GTP-U tunnel, and performs differentiation processing in the tunnel.

In an embodiment of the present disclosure, the UPF may identify a start data packet and an end data packet in the sub-data packets in a process that the application server transmits the sub-data packets obtained by splitting to the UPF.

Step S1140. The sub-data packets are transmitted to arrive at a gNB, and the gNB transmits the sub-data packets.

In an embodiment of the present disclosure, the UPF transmits the sub-data packets to the gNB after receiving the sub-data packets transmitted by the application server, and then the gNB transmits the sub-data packets to a user equipment. The gNB may be augmented to identify the indication information in the sub-data packets, so as to determine the start data packet and the end data packet, thereby identifying a series of sub-data packets obtained by splitting the advanced interactive data packet. Meanwhile, the gNB places different types of sub-data packets received from the same GTP-U tunnel into the same DRB and transmits to the user equipment.

Step S1150. The gNB transmits the mth sub-data packet to the user equipment. If the mth sub-data packet is transmitted successfully, then step S1160 is performed. If the mth sub-data packet fails to transmit, then step S1170 is performed.

In an embodiment of the present disclosure, the gNB may transmit the sub-data packets to the user equipment through a Uu interface. Meanwhile, whether the data is transmitted successfully or fails to transmit may be determined through protocols of a Uu interface, such as a PDCP and an RLC.

Step S1160. Continue to transmit the next sub-data packet until all split sub-data packets are transmitted when or in response to a determination that the data is transmitted successfully.

Step S1170. Discard the received sub-data packets on a gNB side if the data fails to transmit. At this moment, other sub-data packets transmitted by the UPF are not transmitted to the user equipment. The sub-data packets obtained by splitting an associated P-frame advanced interactive data packet are also discarded when or in response to a determination that the I-frame advanced interactive data packet fails to transmit.

Step S1180. The gNB provides feedback information to the UPF, and notifies the UPF to stop transmitting sub-data packets to the UPF. The feedback information does not may be provided to the UPF when or in response to a determination that the gNB has received all sub-data packets obtained by splitting the advanced interactive data packet.

In an embodiment of the present disclosure, the technical solutions of the embodiments as shown in FIG. 10 and FIG. 11 may also be combined. That is, the UE feeds back from an application layer to an application server in response to detecting that the advanced interactive data packet fails to transmit, and the gNB may also provide the feedback information for the UPF to notify the UPF to stop transmitting sub-data packets to the gNB after determining that the advanced interactive data packet fails to transmit.

Figure 12:
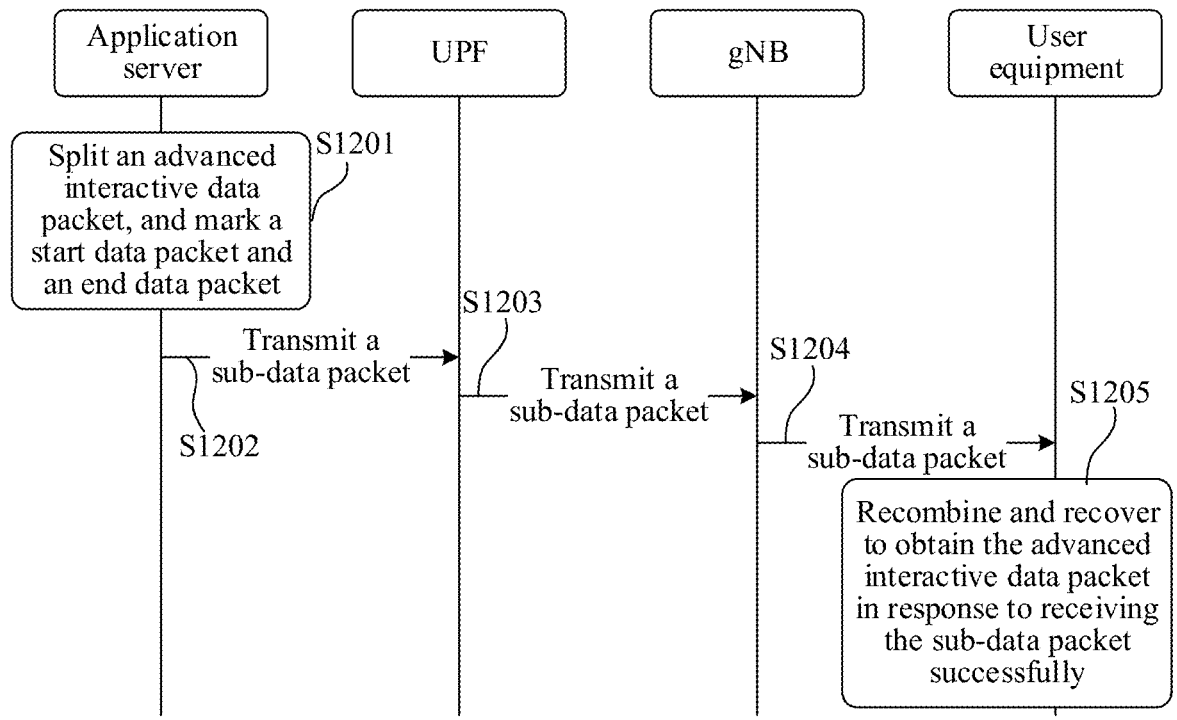
FIG. 12 is a schematic diagram of a transmission flowchart according to certain embodiment(s) of the present disclosure.

In an embodiment of the present disclosure, after each node configures transmission parameters of the advanced interactive data packet, as shown in FIG. 12, an interaction process among the application server, the UPF, the gNB, and the user equipment includes the following steps:

Step S1201. The application server splits the advanced interactive data packet to obtain sub-data packets, and marks a start data packet and an end data packet.

In an embodiment of the present disclosure, indication information may be added to the start data packet and the end data packet to mark which is sub-data packet is the start data packet and which sub-data packet is the end data packet. In certain embodiment(s), the indication information may be added to a protocol field or payload information of a data packet, for example, the indication information is added to the protocol field of a GTP-U tunnel protocol.

Step S1202. The application server transmits sub-data packets to the UPF.

In an embodiment of the present disclosure, the UPF may identify a start data packet and an end data packet in the sub-data packets in a process that the application server transmits the sub-data packets obtained by splitting to the UPF.

Step S1203. The UPF transmits sub-data packets to the gNB.

In an embodiment of the present disclosure, the UPF may place different types of sub-data packets into the same GTP-U channel and transmit the sub-data packets to the gNB, and different types of the sub-data packets may be differentially processed in the tunnel.

In certain embodiment(s), a process that the UPF transmits the sub-data packets to the gNB and the process that the application server transmits the sub-data packets to the UPF may be performed synchronously. For example, after the sub-data packets transmitted by the application server are received by the UPF and are not completely received, the sub-data packets may be transmitted to the gNB. This mode can reduce the delay of the sub-data packets arriving at user equipment. In certain embodiment(s), the UPF may also transmit the sub-data packets to the gNB after receiving the sub-data packets transmitted by the application server. This mode has the advantage that: the problem of the waste of transmission resources caused by the fact that the sub-data packets transmitted to the gNB previously are invalid due to an error of the UPF during receiving can be avoided.

In an embodiment of the present disclosure, the UPF may stop transmitting the remaining sub-data packets of a certain type of advanced interactive data packet to the gNB in response to detecting that the sub-data packets obtained by splitting this type of advanced interactive data packet fail to transmit or detecting that the transmission of the sub-data packets exceeds a delay desirable in a process that the UPF transmits the sub-data packets obtained by splitting the advanced interactive data packets to the gNB, which avoids the occupation of transmission resources caused by continuous transmission. The UPF may also delete the received sub-data packets obtained by splitting this type of advanced interactive data packet, and meanwhile, the UPF may also notify the application server to stop transmitting the sub-data packets obtained by splitting this type of advanced interactive data packet to the UPF.

In an embodiment of the present disclosure, the UPF may also stop transmitting the sub-data packets obtained by splitting a certain type of advanced interactive data packet to the gNB in response to not completely receiving the sub-data packets obtained by splitting this type of advanced interactive data packet within a certain time length, the UPF may also delete the received sub-data packets obtained by splitting this type of advanced interactive data packet, and meanwhile, the UPF may also notify the application server to stop transmitting the sub-data packets obtained by splitting this type of advanced interactive data packet to the application server.

Step S1204. The gNB transmits sub-data packets to the user equipment.

In an embodiment of the present disclosure, the gNB may transmit the sub-data packets obtained by splitting different types of advanced interactive data packets to the user equipment through the same DRB.

In certain embodiment(s), a process that the gNB transmits the sub-data packets to the user equipment and the process that the UPF transmits the sub-data packets to the gNB may be performed synchronously. For example, after the sub-data packets transmitted by the UPF are received by the gNB and are not completely received, the sub-data packets may be transmitted to the user equipment. This mode can reduce the delay of the sub-data packets arriving at the user equipment. In certain embodiment(s), the gNB may also transmit the sub-data packets to the user equipment after receiving the sub-data packets transmitted by the UPF. This mode has the advantage that: the problem of the waste of transmission resources caused by the fact that the sub-data packets transmitted to the user equipment previously are invalid due to an error of the gNB during receiving can be avoided.

In an embodiment of the present disclosure, the gNB may stop transmitting the remaining sub-data packets obtained by splitting a certain type of advanced interactive data packet to the user equipment in response to detecting that the sub-data packets obtained by splitting this type of advanced interactive data packet fail to transmit or detecting that the transmission of the sub-data packets exceeds a delay desirable in a process that the gNB transmits the sub-data packets obtained by splitting the advanced interactive data packets to the user equipment, which avoids the occupation of transmission resources caused by continuous transmission. The gNB may also delete the received sub-data packets obtained by splitting this type of advanced interactive data packet, and meanwhile, the gNB may also notify the UPF to stop transmitting the sub-data packets obtained by splitting this type of advanced interactive data packet to the gNB.

In an embodiment of the present disclosure, the gNB may also stop transmitting the sub-data packets obtained by splitting a certain type of advanced interactive data packet to the user equipment in response to not completely receiving the sub-data packets obtained by splitting this type of advanced interactive data packet within a certain time length, the gNB may also delete the received sub-data packets obtained by splitting this type of advanced interactive data packet, and meanwhile, the gNB may also notify the UPF to stop transmitting the sub-data packets obtained by splitting this type of advanced interactive data packet to the gNB.

Step S1205. The user equipment recombines to recover the advanced interactive data packet in response to receiving all sub-data packets successfully.

In an embodiment of the present disclosure, the user equipment may feed back from an application layer to the application server in response to detecting that a certain type of advanced interactive data packet fails to transmit. In certain embodiment(s), the user equipment may determine that a certain type of advanced interactive data packet fails to transmit in response to not completely receiving all sub-data packets of this type of advanced interactive data packet within a certain time limit. The information fed back to the application server is used for indicating that this type of advanced interactive data packet has failed to transmit.

According to the technical solutions of the embodiments of the present disclosure, a plurality of types of advanced interactive data packets may be transmitted in the same GTP-U tunnel and correspond to the same DRB, so that the influence on a protocol side may be reduced on the premise of supporting the transmission of the plurality of types of advanced interactive data packets. Meanwhile, the occupation of bandwidth caused by continuing to transmit other sub-data packets to the next level of node when or in response to a determination that the sub-data packets obtained by splitting the advanced interactive data packet fail to transmit or the transmission exceeds a delay desirable, which is beneficial to reducing the occupation of transmission resources during transmitting the advanced interactive data packets.

Although the steps in the flowcharts of the embodiments are displayed sequentially according to instructions of arrows, these steps are not necessarily performed sequentially according to a sequence instructed by the arrows. Unless otherwise explicitly specified in the present disclosure, execution of the steps is not strictly limited, and the steps may be performed in other sequences. In addition, at least some steps in the flowcharts of the embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

The following describes apparatus embodiments of the present disclosure, which can be used to implement the data transmission method in the embodiments of the present disclosure. For details undisclosed in the apparatus embodiments of the present disclosure, refer to the embodiments of the data transmission method in the present disclosure.

Figure 13:
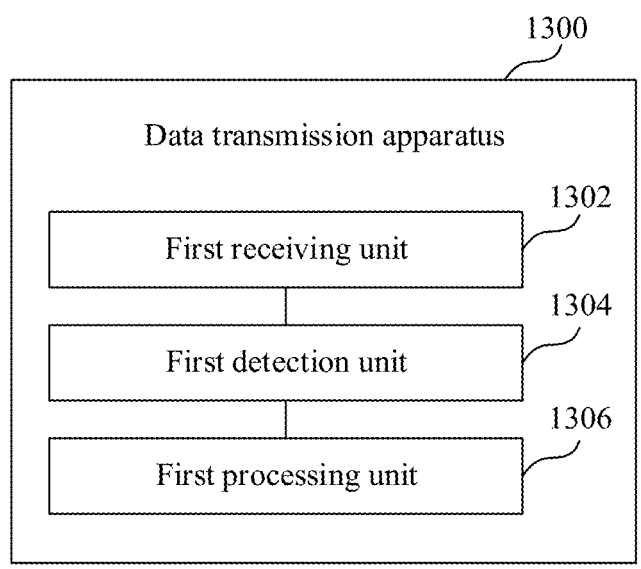
FIG. 13 is a schematic block diagram of a data transmission apparatus according to certain embodiment(s) of the present disclosure.

FIG. 13 is a block diagram of a data transmission apparatus according to an embodiment of the present disclosure. The data transmission apparatus may be arranged in a gNB.

Referring to FIG. 13, a data transmission apparatus 1300 according to an embodiment of the present disclosure includes: a first receiving unit 1302, a first detection unit 1304, and a first processing unit 1306.

The first receiving unit 1302 is configured to receive access stratum context information transmitted by an AMF, the access stratum context information being used for indicating that a plurality of types of advanced interactive data packets are differentially transmitted in the same GTP-U tunnel and are carried by the same DRB. The first detection unit 1304 is configured to detect, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB. The first processing unit 1306 is configured to stop transmitting the remaining sub-data packets obtained by splitting a specified type of advanced interactive data packet to the user equipment in response to detecting that there is a sub-data packet that fails to transmit to the user equipment in the sub-data packets obtained by splitting the specified type of advanced interactive data packet.

In some embodiments of the present disclosure, based on the solutions, the first processing unit 1306 is further configured to: discard the received sub-data packets obtained by splitting the specified type of advanced interactive data packet in response to detecting that there is a sub-data packet that fails to transmit to the user equipment in the sub-data packets obtained by splitting the specified type of advanced interactive data packet.

In some embodiments of the present disclosure, based on the solutions, the first processing unit 1306 is further configured to: transmit feedback information to the user plane function entity in response to detecting that there is a sub-data packet that fails to transmit to the user equipment in the sub-data packets obtained by splitting the specified type of advanced interactive data packet, the feedback information being used for indicating that the user plane function entity stops transmitting the sub-data packets obtained by splitting the specified type of advanced interactive data packet.

In some embodiments of the present disclosure, based on the solutions, the first processing unit 1306 is configured to: transmit feedback information to the user plane function entity in response to not completely receiving all sub-data packets obtained by splitting the specified type of advanced interactive data packet.

In some embodiments of the present disclosure, based on the solutions, the plurality of sub-data packets obtained by splitting the advanced interactive data packet include a start data packet and an end data packet. The start data packet includes first indication information, and the first indication information is used for indicating that the start data packet is the first transmitted sub-data packet of the plurality of sub-data packets. The end data packet includes second indication information, and the second indication information is used for indicating that the end data packet is the last transmitted sub-data packet of the plurality of sub-data packets.

In some embodiments of the present disclosure, based on the solutions, the first detection unit 1304 is further configured to: identify whether the received data packet belongs to the sub-data packets obtained by splitting the advanced interactive data packet according to the indication information contained in a protocol field of the received data packet.

In some embodiments of the present disclosure, based on the solutions, the first detection unit 1304 is further configured to: identify whether the received data packet belongs to the sub-data packet obtained by splitting the advanced interactive data packet according to the indication information contained in payload information of the received data packet.

In some embodiments of the present disclosure, based on the solutions, the first processing unit 1306 is further configured to: stop transmitting the sub-data packets obtained by splitting the specified type of advanced interactive data packet to the user equipment, and discard the received sub-data packets obtained by splitting the specified type of advanced interactive data packet in response to not completely receiving all sub-data packets obtained by splitting the specified type of advanced interactive data packet transmitted by the user plane function entity within a set time length.

In some embodiments of the present disclosure, based on the solutions, a plurality of types of advanced interactive data packet includes: an advanced interactive data packet corresponding to a key frame and an advanced interactive data packet corresponding to a non-key frame. The first processing unit 1306 is further configured to: stop transmitting the advanced interactive data packet corresponding to the non-key frame and associated with the key frame to the user equipment, and/or discard the received advanced interactive data packet corresponding to the non-key frame and associated with the specified key frame in response to detecting that there is a data packet that fails to transmit to the user equipment in the sub-data packets obtained by splitting the advanced interactive data packet corresponding to the specified key frame.

Figure 14:
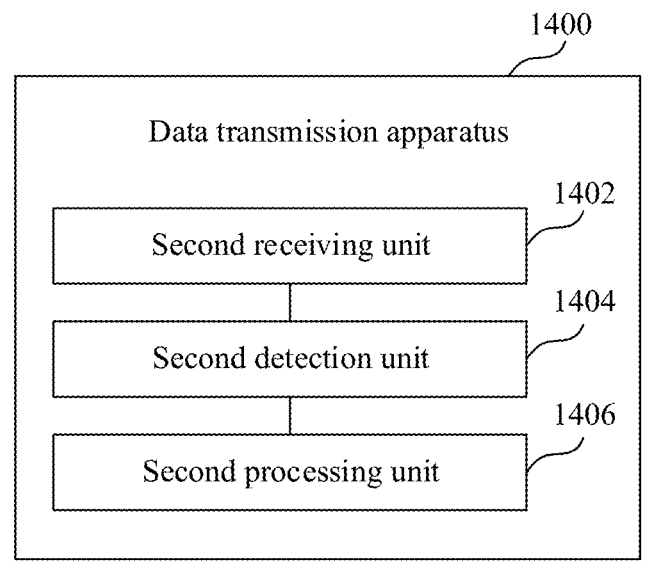
FIG. 14 is a schematic block diagram of a data transmission apparatus according to certain embodiment(s) of the present disclosure an embodiment of the present disclosure.

FIG. 14 is a block diagram of a data transmission apparatus according to an embodiment of the present disclosure. The data transmission apparatus may be arranged inside a user plane function entity.

Referring to FIG. 14, a data transmission apparatus 1400 according to an embodiment of the present disclosure includes: a second receiving unit 1402, a second detection unit 1404, and a second processing unit 1406.

The second receiving unit 1402 is configured to receive PDU session management policy information transmitted by an SMF, the PDU session management policy information being used for indicating that a plurality of types of advanced interactive data packets are differentially transmitted in the same GTP-U tunnel and are carried by the same DRB. The second detection unit 1404 is configured to distribute and transmit, in the GTP-U tunnel, the received sub-data packets obtained by splitting the plurality of types of advanced interactive data packets to a next generation nodeB, and detect whether there is a sub-data packet that fails to transmit to the next generation nodeB in the sub-data packets obtained by splitting the advanced interactive data packet. The second processing unit 1406 is configured to stop transmitting the remaining sub-data packets obtained by splitting the specified type of advanced interactive data packet to the next generation nodeB in response to detecting that there is a sub-data packet that fails to transmit to the next generation nodeB in the sub-data packets obtained by splitting the specified type of advanced interactive data packet.

In some embodiments of the present disclosure, based on the solutions, the second processing unit 1406 is further configured to: discard the received sub-data packets obtained by splitting the specified type of advanced interactive data packet in response to detecting that there is a sub-data packet that fails to transmit to the next generation nodeB in the sub-data packets obtained by splitting the specified type of advanced interactive data packet.

In some embodiments of the present disclosure, based on the solutions, the second processing unit 1406 is further configured to: transmit feedback information to an application server in response to detecting that there is a sub-data packet that fails to transmit to the next generation nodeB in the sub-data packets obtained by splitting the specified type of advanced interactive data packet, the feedback information being used for instructing the application server to stop transmitting the sub-data packets obtained by splitting the specified type of advanced interactive data packet.

In some embodiments of the present disclosure, based on the solutions, the second processing unit 1406 is configured to: transmit feedback information to the application server in response to not completely receiving all sub-data packets obtained by splitting the specified type of advanced interactive data packet.

In some embodiments of the present disclosure, based on the solutions, the second processing unit 1406 is further configured to: stop transmitting the sub-data packets obtained by splitting the specified type of advanced interactive data packet to the next generation nodeB, and discard the received sub-data packets obtained by splitting the specified type of advanced interactive data packet in response to not completely receiving all sub-data packets obtained by splitting the specified type of advanced interactive data packet transmitted within a set time length.

In some embodiments of the present disclosure, based on the solutions, a plurality of types of advanced interactive data packet includes: an advanced interactive data packet corresponding to a key frame and an advanced interactive data packet corresponding to a non-key frame. The second processing unit 1406 is further configured to: stop transmitting the advanced interactive data packet corresponding to the non-key frame and associated with the key frame to the next generation nodeB, and/or discard the received advanced interactive data packet corresponding to the non-key frame and associated with the specified key frame in response to detecting that there is a data packet that fails to transmit to the next generation nodeB in the sub-data packets obtained by splitting the advanced interactive data packet corresponding to the specified key frame.

Figure 15:
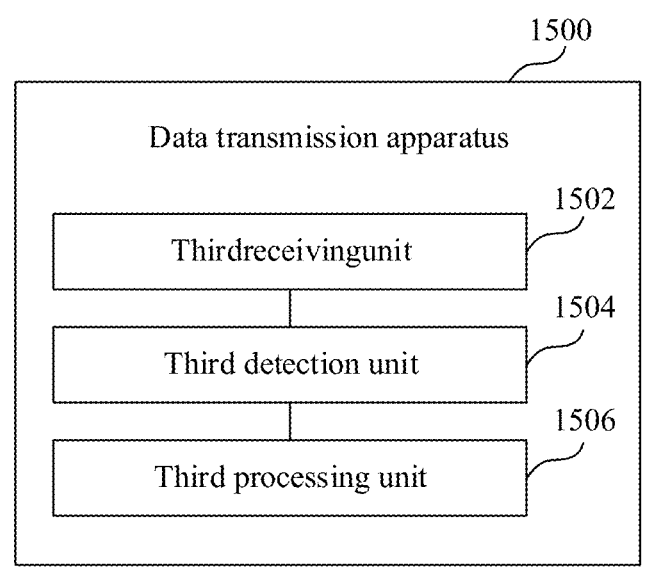
FIG. 15 is a schematic block diagram of a data transmission apparatus according to certain embodiment(s) of the present disclosure.

FIG. 15 is a block diagram of a data transmission apparatus according to an embodiment of the present disclosure. The data transmission apparatus may be arranged inside a user equipment.

Referring to FIG. 15, a data transmission apparatus 1500 according to an embodiment of the present disclosure includes: a third receiving unit 1502, a third detection unit 1504, and a third processing unit 1506.

The third receiving unit 1502 is configured to receive a URSP rule transmitted by an AMF, the URSP rule being used for indicating that a plurality of types of advanced interactive data packets are differentially transmitted in the same GTP-U tunnel and are carried by the same DRB. The third detection unit 1504 is configured to detect, in response to identifying that a data packet transmitted by the next generation nodeB on the basis of the DRB belongs to sub-data packets obtained by splitting the advanced interactive data packet, a receiving condition of the sub-data packet during receiving the sub-data packets obtained by splitting the advanced interactive data packet. The third processing unit 1506 is configured to integrate all of the data packets to obtain the specified type of advanced interactive data packet in response to receiving all sub-data packets obtained by splitting the specified type of advanced interactive data packet.

In some embodiments of the present disclosure, based on the solutions, the third processing unit 1506 is further configured to: discard the received sub-data packets obtained by splitting the specified type of advanced interactive data packet in response to not completely receiving all sub-data packets obtained by splitting the specified type of advanced interactive data packet transmitted within a set time length.

In some embodiments of the present disclosure, based on the solutions, the third processing unit 1506 is further configured to: transmit feedback information to the application server that transmits the specified type of advanced interactive data packet to indicate that the specified type of advanced interactive data packet fails to transmit in response to not completely receiving all-data packets obtained by splitting the specified type of advanced interactive data packet within a set time length.

Figure 16:
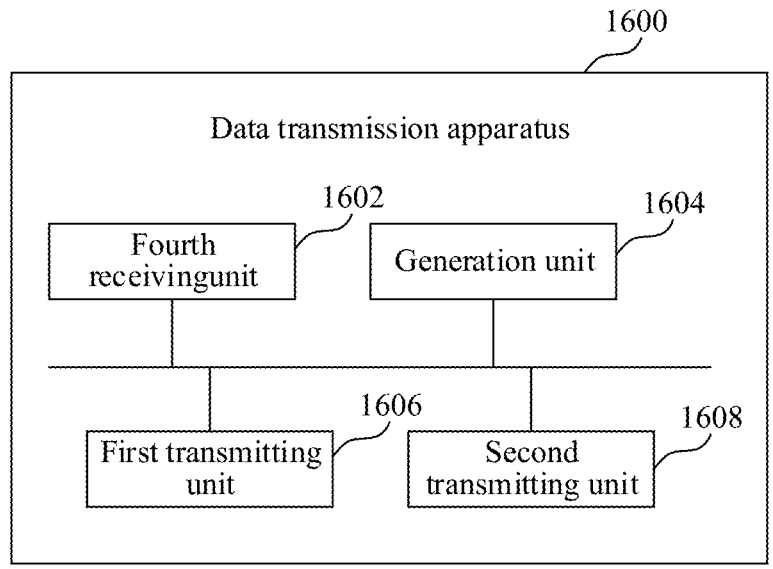
FIG. 16 is a schematic block diagram of a data transmission apparatus according to certain embodiment(s) of the present disclosure.

FIG. 16 is a block diagram of a data transmission apparatus according to an embodiment of the present disclosure. The data transmission apparatus may be arranged inside a PCF.

Referring to FIG. 16, a data transmission apparatus 1600 according to an embodiment of the present disclosure includes: a fourth receiving unit 1602, a generation unit 1604, a first transmitting unit 1606, and a second transmitting unit 1608.

The fourth receiving unit 1602 is configured to: receive GTP-U tunnel configuration information transmitted by an AF for an advanced interactive data packet, the GTP-U tunnel configuration information being used for indicating that a plurality of types of advanced interactive data packets are differentially transmitted in the same GTP-U tunnel and are carried by the same DRB. The generation unit 1604 is configured to generate a URSP rule and a PDU session management policy information according to the GTP-U tunnel configuration information, the URSP rule and the PDU session management policy information being used for indicating that a plurality of types of advanced interactive data packets are differentially transmitted in the same GTP-U tunnel and are carried by the same DRB. The first transmitting unit 1606 is configured to transmit the URSP rule to the AMF, so that the AMF forwards the URSP rule to a user equipment and configures access stratum context information to a next generation nodeB according to the URSP rule, the access stratum context information being used for indicating that a plurality of types of advanced interactive data packets are differentially transmitted in the same GTP-U tunnel and are carried by the same DRB. The transmitting unit 1608 is configured to transmit the PDU session management policy information to the SMF, so that the SMF configures the PDU session management policy information to a user plane function entity.

Figure 17:
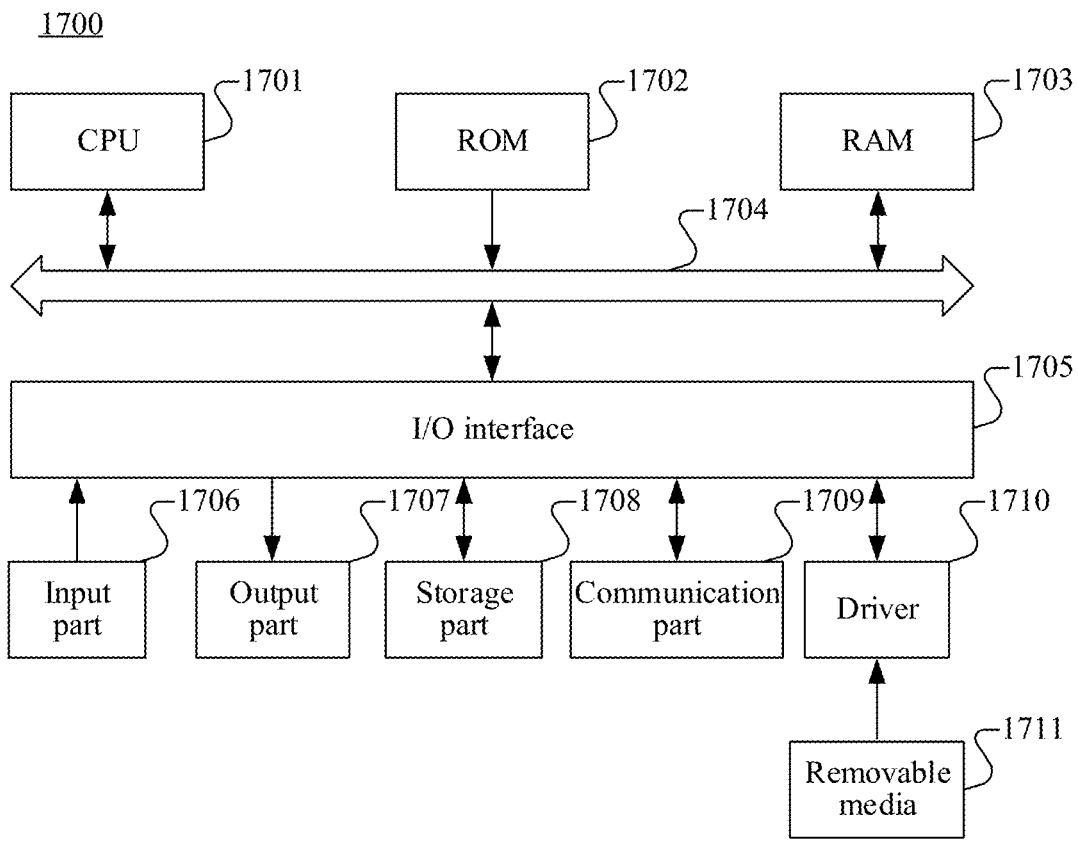
FIG. 17 is a schematic structural diagram of a computer system according to certain embodiment(s) of the present disclosure.

FIG. 17 is a schematic structural diagram of a computer system adapted to implement an electronic device according to an embodiment of the present disclosure.

A computer system 1700 of the electronic device shown in FIG. 17 is merely an example, and does not constitute any limitation on functions and use ranges of the embodiments of the present disclosure.

As shown in FIG. 17, the computer system 1700 includes a central processing unit (CPU) 1701, which may perform various suitable actions and processing based on a computer readable instruction stored in a read-only memory (ROM) 1702 or a computer readable instruction loaded from a storage part 1708 into a random access memory (RAM) 1703, for example, perform the method described in the embodiments. The RAM 1703 further stores various computer readable instructions and data desired for system operations. The CPU 1701, the ROM 1702, and the RAM 1703 are connected to each other through a bus 1704. An input/output (I/O) interface 1705 is also connected to the bus 1704.

The following components are connected to the I/O interface 1705: an input part 1706 including a keyboard, a mouse, or the like; an output part 1707 including a cathode ray tube (CRT), a liquid crystal display (LCD), a speaker, or the like; a storage part 1708 including a hard disk, or the like; and a communication part 1709 including a network interface card such as a local area network (LAN) card or a modem. The communication part 1709 performs communication processing by using a network such as the Internet. A drive 1710 is also connected to the I/O interface 1705 as desired. A removable medium 1711, such as a magnetic disk, an optical disc, a magneto-optical disk, or a semiconductor memory, is mounted on the driver 1710 as desired, so that a computer readable instruction read from the removable medium is installed into the storage part 1708 as desired.

Particularly, according to an embodiment of the present disclosure, the processes described above by referring to the flowcharts may be implemented as computer software programs. For example, an embodiment of the present disclosure includes a computer program product. The computer program product includes a computer program stored in a computer readable medium. The computer program includes a computer readable instruction used for performing a method shown in the flowchart. In such an embodiment, the computer program may be downloaded and installed through the communication part 1709 from a network, and/or installed from the removable medium 1711. When the computer readable instruction is executed by the CPU 1701, the various functions defined in the system of the present disclosure are executed.

The computer readable medium shown in the embodiments of the present disclosure may be a computer readable signal medium or a computer readable storage medium or any combination thereof. The computer readable storage medium may be, for example, but is not limited to, an electrical, magnetic, optical, electromagnetic, infrared, or semiconductor system, apparatus, or device, or any combination thereof. A more specific example of the computer readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer readable storage medium may be any tangible medium including or storing a computer readable instruction, and the computer readable instruction may be used by or used in combination with an instruction execution system, an apparatus, or a device. In the present disclosure, a computer readable signal medium may include a data signal in a baseband or propagated as a part of a carrier wave, the data signal carrying a computer readable instruction. A data signal propagated in such a way may assume a plurality of forms, including, but not limited to, an electromagnetic signal, an optical signal, or any appropriate combination thereof. The computer readable signal medium may be further any computer readable medium in addition to a computer readable storage medium. The computer readable medium may send, propagate, or transmit a computer readable instruction that is used by or used in combination with an instruction execution system, apparatus, or device. The computer readable instruction included in the computer readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a computer readable instruction segment, or a part of code. The module, the computer readable instruction segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A related unit described in the embodiments of the present disclosure may be implemented in a software manner, or may be implemented in a hardware manner, and the unit described may also be set in a processor. Names of the units do not constitute a limitation on the units.

According to another aspect, the present disclosure further provides a computer readable medium. The computer readable medium may be included in the electronic device described in the embodiments, or may exist alone and is not assembled in the electronic device. The computer readable medium carries one or more computer readable instructions, the one or more computer readable instructions, when executed by the electronic device, causing the electronic device to implement the method described in the embodiments.

Although a plurality of modules or units of a device configured to perform actions are discussed in the detailed description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

Through the descriptions of the implementations, a person skilled in the art easily understands that the exemplary implementations described herein may be implemented through software, or may be implemented through software located in combination with suitable hardware. Therefore, the technical solutions of the embodiments of the present disclosure may be implemented in a form of a software product. The software product may be stored in a non-volatile storage medium or on the network, including several instructions for instructing a computing device to perform the methods according to the embodiments of the present disclosure. The non-volatile storage medium may be, for example, a CD-ROM, a USB flash disk, or a mobile hard disk. The computing device may be a personal computer, a server, a touch terminal, a network device, or the like.

What is claimed is:

1. A data transmission method, comprising:
   receiving access stratum context information transmitted by an access and mobility management function (AMF), the access stratum context information being used for indicating that a plurality of types of advanced interactive data packets are transmitted in the same general packet radio service tunneling protocol-user plane (GTP-U) tunnel and are carried by the same data radio bearer (DRB);
   detecting, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB; and stopping transmitting the remaining sub-data packets obtained by splitting a specified type of advanced interactive data packet to the user equipment in response to detecting that there is a sub-data packet that fails transmit to the user equipment in the sub-data packets obtained by splitting the specified type of advanced interactive data packet.

2. The data transmission method according to claim 1, further comprising:

discarding the received sub-data packets obtained by splitting the specified type of advanced interactive data packet in response to detecting that there is a sub-data packet that fails to transmit to the user equipment in the sub-data packets obtained by splitting the specified type of advanced interactive data packet.

3. The data transmission method according to claim 1, further comprising:

transmitting feedback information to the user plane function entity in response to detecting that there is a sub-data packet that fails to transmit to the user equipment in the sub-data packets obtained by splitting the specified type of advanced interactive data packet, the feedback information being used for instructing the user plane function entity to stop transmitting the sub-data packets obtained by splitting the specified type of advanced interactive data packet.

4. The data transmission method according to claim 3, wherein transmitting the feedback information comprises:

transmitting feedback information to the user plane function entity in response to not completely receiving all sub-data packets obtained by splitting the specified type of advanced interactive data packet.

5. The data transmission method according to claim 1, wherein the plurality of sub-data packets obtained by splitting the advanced interactive data packet include a start data packet and an end data packet;

the start data packet includes first indication information, the first indication information being used for indicating that the start data packet is the first transmitted sub-data packet of the plurality of sub-data packets; and the end data packet includes second indication information, the second indication information being used for indicating that the end data packet is the last transmitted sub-data packet of the plurality of sub-data packets.

6. The data transmission method according to claim 1, further comprising:

identifying whether the received data packet belongs to the sub-data packets obtained by splitting the advanced interactive data packet according to the indication information contained in a protocol field of the received data packet; or identifying whether the received data packet belongs to the sub-data packets obtained by splitting the advanced interactive data packet according to the indication information contained in payload information of the received data packet.

7. The data transmission method according to claim 1, further comprising:

stopping transmitting the sub-data packets obtained by splitting the specified type of advanced interactive data packet to the user equipment, and discarding the received sub-data packets obtained by splitting the specified type of advanced interactive data packet in response to not completely receiving all sub-data packets obtained by splitting the specified type of advanced interactive data packet transmitted by the user plane function entity within a set time length.

8. The data transmission method according to claim 1, wherein the plurality of types of advanced interactive data packets includes: an advanced interactive data packet corresponding to a key frame and an advanced interactive data packet corresponding to a non-key frame, the data transmission method further comprises one or both of:

stopping transmitting the received advanced interactive data packet corresponding to the non-key frame and associated with the specified key frame to the user equipment; and discarding the received advanced interactive data packet corresponding to the non-key frame and associated with the specified key frame in response to detecting that there is a sub-data packet that fails to transmit to the user equipment in the sub-data packets obtained by splitting the specified type of advanced interactive data packet corresponding to the specified key frame.

9. A data transmission apparatus, comprising: a memory storing computer program instructions; and a processor coupled to the memory and configured to execute the computer program instructions and perform:

receiving access stratum context information transmitted by an access and mobility management function (AMF), the access stratum context information being used for indicating that a plurality of types of advanced interactive data packets are transmitted in the same general packet radio service tunneling protocol-user plane (GTP-U) tunnel and are carried by the same data radio bearer (DRB);

detecting, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB; and stopping transmitting the remaining sub-data packets obtained by splitting a specified type of advanced interactive data packet to the user equipment in response to detecting that there is a sub-data packet that fails transmit to the user equipment in the sub-data packets obtained by splitting the specified type of advanced interactive data packet.

10. The data transmission apparatus according to claim 9, wherein the processor is further configured to execute the computer program instructions and perform:

discarding the received sub-data packets obtained by splitting the specified type of advanced interactive data packet in response to detecting that there is a sub-data packet that fails to transmit to the user equipment in the sub-data packets obtained by splitting the specified type of advanced interactive data packet.

11. The data transmission apparatus according to claim 9, wherein the processor is further configured to execute the computer program instructions and perform:

transmitting feedback information to the user plane function entity in response to detecting that there is a sub-data packet that fails to transmit to the user equipment in the sub-data packets obtained by splitting the specified type of advanced interactive data packet, the feedback information being used for instructing the user plane function entity to stop transmitting the sub-data packets obtained by splitting the specified type of advanced interactive data packet.

12. The data transmission apparatus according to claim 11, wherein transmitting the feedback information includes:
transmitting feedback information to the user plane function entity in response to not completely receiving all sub-data packets obtained by splitting the specified type of advanced interactive data packet.

13. The data transmission apparatus according to claim 9, wherein the plurality of sub-data packets obtained by splitting the advanced interactive data packet include a start data packet and an end data packet;
the start data packet includes first indication information, the first indication information being used for indicating that the start data packet is the first transmitted sub-data packet of the plurality of sub-data packets; and
the end data packet includes second indication information, the second indication information being used for indicating that the end data packet is the last transmitted sub-data packet of the plurality of sub-data packets.

14. The data transmission apparatus according to claim 9, wherein the processor is further configured to execute the computer program instructions and perform:
identifying whether the received data packet belongs to the sub-data packets obtained by splitting the advanced interactive data packet according to the indication information contained in a protocol field of the received data packet; or
identifying whether the received data packet belongs to the sub-data packets obtained by splitting the advanced interactive data packet according to the indication information contained in payload information of the received data packet.

15. The data transmission apparatus according to claim 9, wherein the processor is further configured to execute the computer program instructions and perform:
stopping transmitting the sub-data packets obtained by splitting the specified type of advanced interactive data packet to the user equipment, and discarding the received sub-data packets obtained by splitting the specified type of advanced interactive data packet in response to not completely receiving all sub-data packets obtained by splitting the specified type of advanced interactive data packet transmitted by the user plane function entity within a set time length.

16. The data transmission apparatus according to claim 9, wherein the plurality of types of advanced interactive data packets includes: an advanced interactive data packet corresponding to a key frame and an advanced interactive data packet corresponding to a non-key frame, wherein the processor is further configured to execute the computer program instructions and perform one or both of:
stopping transmitting the received advanced interactive data packet corresponding to the non-key frame and associated with the specified key frame to the user equipment; and
discarding the received advanced interactive data packet corresponding to the non-key frame and associated with the specified key frame in response to detecting that there is a sub-data packet that fails to transmit to the user equipment in the sub-data packets obtained by splitting the specified type of advanced interactive data packet corresponding to the specified key frame.

17. A non-transitory computer-readable storage medium storing computer program instructions executable by at least one processor to perform:
receiving access stratum context information transmitted by an access and mobility management function (AMF), the access stratum context information being used for indicating that a plurality of types of advanced interactive data packets are transmitted in the same general packet radio service tunneling protocol-user plane (GTP-U) tunnel and are carried by the same data radio bearer (DRB);
detecting, in response to identifying that a data packet transmitted by a user plane function entity through the GTP-U tunnel belongs to sub-data packets obtained by splitting the advanced interactive data packet, whether there is a sub-data packet that fails to transmit to a user equipment in the sub-data packets obtained by splitting the advanced interactive data packet during transmitting the sub-data packets obtained by splitting the advanced interactive data packet to the user equipment on the basis of the DRB; and
stopping transmitting the remaining sub-data packets obtained by splitting a specified type of advanced interactive data packet to the user equipment in response to detecting that there is a sub-data packet that fails transmit to the user equipment in the sub-data packets obtained by splitting the specified type of advanced interactive data packet.

18. The non-transitory computer-readable storage medium according to claim 17, wherein the computer program instructions are further executable by the at least one processor to perform:
discarding the received sub-data packets obtained by splitting the specified type of advanced interactive data packet in response to detecting that there is a sub-data packet that fails to transmit to the user equipment in the sub-data packets obtained by splitting the specified type of advanced interactive data packet.

19. The non-transitory computer-readable storage medium according to claim 17, wherein the computer program instructions are further executable by the at least one processor to perform:
transmitting feedback information to the user plane function entity in response to detecting that there is a sub-data packet that fails to transmit to the user equipment in the sub-data packets obtained by splitting the specified type of advanced interactive data packet, the feedback information being used for instructing the user plane function entity to stop transmitting the sub-data packets obtained by splitting the specified type of advanced interactive data packet.

20. The non-transitory computer-readable storage medium according to claim 19, wherein transmitting the feedback information includes:
transmitting feedback information to the user plane function entity in response to not completely receiving all sub-data packets obtained by splitting the specified type of advanced interactive data packet.

* * * * *